(12) United States Patent
Perry, II et al.

(10) Patent No.: US 8,910,196 B2
(45) Date of Patent: Dec. 9, 2014

(54) BROADCAST AREA IDENTIFICATION AND CONTENT DISTRIBUTION

(75) Inventors: Jack F. Perry, II, Marion, IA (US);
Michael J. Roeder, Cedar Rapids, IA (US); Brian L. Duhn, Marion, IA (US); David L. Carlile, Cedar Rapids, IA (US); Jason A. Brunken, Marion, IA (US); Steven J. Turley, Palo, IA (US); Matthew J. Youngblut, Marion, IA (US); Grant Keiser, Cedar Rapids, IA (US); Steven C. Maher, Marion, IA (US)

(73) Assignee: Syncbak, Inc.

( * ) Notice: Subject to any disclaimer, the term of this patent is extended or adjusted under 35 U.S.C. 154(b) by 0 days.

(21) Appl. No.: 13/361,275

(22) Filed: Jan. 30, 2012

(65) Prior Publication Data

US 2013/0198787 A1 Aug. 1, 2013

(51) Int. Cl.
*H04N 7/173* (2011.01)
*H04N 21/61* (2011.01)
*H04N 21/45* (2011.01)
*H04N 21/414* (2011.01)

(52) U.S. Cl.
CPC ....... *H04N 21/4524* (2013.01); *H04N 21/6131* (2013.01); *H04N 21/41407* (2013.01); *H04N 7/17345* (2013.01)
USPC ............................... 725/25; 725/62; 725/120

(58) Field of Classification Search
CPC .......... H04N 21/4524; H04N 21/6131; H04N 21/41407; H04N 7/17345
USPC ....................... 725/86, 25, 62, 120
See application file for complete search history.

(56) References Cited

U.S. PATENT DOCUMENTS

| | | | |
|---|---|---|---|
| 5,835,128 A | 11/1998 | Macdonald et al. | |
| 6,252,547 B1 | 6/2001 | Perry | |
| 6,324,694 B1 | 11/2001 | Watts et al. | |
| 6,714,759 B2 | 3/2004 | Perry | |
| 6,732,179 B1 | 5/2004 | Brown et al. | |
| 7,099,655 B2 | 8/2006 | Song et al. | |
| 7,502,832 B2 | 3/2009 | San Andres et al. | |
| 7,509,124 B2 * | 3/2009 | O'Neil | 455/432.2 |
| 7,600,120 B2 | 10/2009 | Monteiro et al. | |
| 7,676,219 B2 * | 3/2010 | Williams et al. | 455/411 |
| 7,890,087 B2 * | 2/2011 | O'Neil | 455/414.1 |
| 8,081,957 B2 * | 12/2011 | O'Neil | 455/414.1 |

(Continued)

FOREIGN PATENT DOCUMENTS

| | | |
|---|---|---|
| CN | 1835641 | 9/2006 |
| CN | 101626573 | 1/2010 |
| EP | 1898645 | 3/2008 |
| EP | 2015576 | 1/2009 |

OTHER PUBLICATIONS

Provisional U.S. Appl. No. 61/444,415, filed Feb. 18, 2011.*
International Search Report and Written Opinion from Application No. PCT/US2011/021226, dated Aug. 22, 2011.
International Search Report and Written Opinion from Application No. PCT/US2011/021234 dated Aug. 22, 2011.

(Continued)

*Primary Examiner* — Nasser Goodarzi
*Assistant Examiner* — Michael B Pierorazio
(74) *Attorney, Agent, or Firm* — Alston & Bird LLP

(57) ABSTRACT

Systems, methods, apparatus, and computer program products are provided for broadcast area identification and content distribution. In one embodiment, a broadcast area associated with an electronic device can be identified. Then, content for the broadcast area can be distributed to the electronic device in accordance with distribution parameters.

15 Claims, 19 Drawing Sheets

(56) References Cited

U.S. PATENT DOCUMENTS

| | | | |
|---|---|---|---|
| 8,082,591 B2 | 12/2011 | Gu et al. | |
| 8,255,378 B2* | 8/2012 | Ji et al. | 707/706 |
| 8,255,940 B2 | 8/2012 | Perry, II | |
| 8,255,941 B2 | 8/2012 | Perry, II | |
| 8,255,942 B2 | 8/2012 | Perry, II | |
| 8,255,943 B2 | 8/2012 | Perry, II | |
| 8,255,944 B2 | 8/2012 | Perry, II | |
| 8,255,945 B2 | 8/2012 | Perry, II | |
| 8,255,946 B2 | 8/2012 | Perry, II | |
| 8,255,947 B2 | 8/2012 | Perry, II | |
| 8,346,230 B2 | 1/2013 | Goodmon et al. | |
| 8,370,872 B1* | 2/2013 | Sun et al. | 725/39 |
| 8,423,004 B2 | 4/2013 | Goodmon et al. | |
| 8,644,354 B2* | 2/2014 | George et al. | 370/522 |
| 8,737,990 B2* | 5/2014 | Moreillon | 455/434 |
| 2002/0183059 A1 | 12/2002 | Noreen et al. | |
| 2003/0097408 A1 | 5/2003 | Kageyama et al. | |
| 2003/0233580 A1* | 12/2003 | Keeler et al. | 713/201 |
| 2004/0198217 A1 | 10/2004 | Lee et al. | |
| 2004/0261092 A1 | 12/2004 | Addington et al. | |
| 2005/0097593 A1 | 5/2005 | Raley et al. | |
| 2006/0064734 A1 | 3/2006 | Ma | |
| 2006/0253560 A1 | 11/2006 | Aaltonen | |
| 2007/0067807 A1* | 3/2007 | O'Neil | 725/62 |
| 2007/0107022 A1 | 5/2007 | Lawrence | |
| 2007/0112935 A1 | 5/2007 | Espelien | |
| 2008/0060035 A1* | 3/2008 | Tsang et al. | 725/109 |
| 2008/0080408 A1 | 4/2008 | Gao | |
| 2008/0081640 A1 | 4/2008 | Tran et al. | |
| 2008/0120681 A1 | 5/2008 | Sibley | |
| 2008/0184326 A1 | 7/2008 | Nakajima | |
| 2008/0201225 A1 | 8/2008 | Maharajh et al. | |
| 2008/0216107 A1 | 9/2008 | Downey et al. | |
| 2008/0235733 A1* | 9/2008 | Heie et al. | 725/46 |
| 2008/0235743 A1 | 9/2008 | Walter et al. | |
| 2008/0254739 A1 | 10/2008 | Kidd | |
| 2008/0270725 A1 | 10/2008 | Roden et al. | |
| 2008/0301736 A1 | 12/2008 | Heilbron et al. | |
| 2008/0307478 A1* | 12/2008 | Kim et al. | 725/114 |
| 2009/0113489 A1* | 4/2009 | O'Neil | 725/62 |
| 2009/0125950 A1 | 5/2009 | Chaudhry et al. | |
| 2009/0165032 A1 | 6/2009 | Burke | |
| 2009/0172784 A1 | 7/2009 | Park et al. | |
| 2009/0196267 A1 | 8/2009 | Walker, Sr. | |
| 2010/0100898 A1 | 4/2010 | Pfleging et al. | |
| 2010/0125511 A1 | 5/2010 | Jouret et al. | |
| 2010/0180305 A1 | 7/2010 | Migos | |
| 2010/0199316 A1* | 8/2010 | Clarniello et al. | 725/62 |
| 2010/0261485 A1 | 10/2010 | Fernandes | |
| 2010/0296487 A1* | 11/2010 | Karaoguz et al. | 370/332 |
| 2011/0086619 A1* | 4/2011 | George et al. | 455/414.1 |
| 2011/0099587 A1* | 4/2011 | O'Neil | 725/62 |
| 2011/0119595 A1 | 5/2011 | Bydeley et al. | |
| 2011/0137592 A1 | 6/2011 | Kim et al. | |
| 2011/0154383 A1 | 6/2011 | Hao et al. | |
| 2011/0196983 A1 | 8/2011 | Goodmon et al. | |
| 2011/0219229 A1 | 9/2011 | Cholas et al. | |
| 2011/0279311 A1 | 11/2011 | Hamano | |
| 2012/0064913 A1 | 3/2012 | Perry, II | |
| 2012/0066321 A1 | 3/2012 | Perry, II | |
| 2012/0127374 A1* | 5/2012 | Kanojia et al. | 348/731 |
| 2012/0196595 A1 | 8/2012 | Perry, II | |
| 2012/0196596 A1 | 8/2012 | Perry, II | |
| 2012/0266201 A1* | 10/2012 | Kanojia et al. | 725/109 |
| 2012/0317596 A1* | 12/2012 | O'Neil | 725/25 |
| 2013/0053057 A1 | 2/2013 | Cansino et al. | |
| 2013/0227708 A1 | 8/2013 | Goodmon et al. | |

OTHER PUBLICATIONS

United States Patent and Trademark Office, Office Action for U.S. Appl. No. 13/288,364, dated Nov. 7, 2012, 16 pages, USA.
United States Patent and Trademark Office, Office Action for U.S. Appl. No. 13/547,934, dated Nov. 13, 2012, 14 pages, USA.
United States Patent and Trademark Office, Office Action for U.S. Appl. No. 13/547,831, dated Nov. 28, 2012, 15 pages, USA.
United States Patent and Trademark Office, Office Action for U.S. Appl. No. 13/288,359, dated Dec. 6, 2012, 17 pages, USA.
Notice of Allowance dated Apr. 23, 2012, for U.S. Appl. No. 12/784,777, filed May 21, 2010.
Notice of Allowance dated Apr. 23, 2012, for U.S. Appl. No. 12/784,783, filed May 21, 2010.
Notice of Allowance dated Apr. 23, 2012, for U.S. Appl. No. 12/784,785, filed May 21, 2010.
Notice of Allowance dated Apr. 23, 2012, for U.S. Appl. No. 12/784,791, filed May 21, 2010.
Notice of Allowance dated Apr. 27, 2012, for U.S. Appl. No. 12/872,595, filed Aug. 31, 2010.
Notice of Allowance dated May 1, 2012, for U.S. Appl. No. 12/872,681, filed Aug. 31, 2010.
Notice of Allowance dated Apr. 27, 2012, for U.S. Appl. No. 12/872,757, filed Aug. 31, 2010.
Notice of Allowance dated Apr. 27, 2012, for U.S. Appl. No. 12/872,799, filed Aug. 31, 2010.
United States Patent and Trademark Office, Office Action for U.S. Appl. No. 13/288,359, Dec. 6, 2012, 16 pages, USA.
United States Patent and Trademark Office, Office Action for U.S. Appl. No. 13/229,376, Jan. 16, 2013, 11 pages, USA.
United States Patent & Trademark Office, Office Action for U.S. Appl. No. 13/288,359, Apr. 5, 2013, 13 pages, USA.
United States Patent & Trademark Office, Office Action for U.S. Appl. No. 13/288,364, Apr. 12, 2013, 14 pages, USA.
United States Patent & Trademark Office, Office Action for U.S. Appl. No. 13/547,831, Apr. 11, 2013, 14 pages, USA.
United States Patent & Trademark Office, Office Action for U.S. Appl. No. 13/547,934, Apr. 10, 2013, 15 pages, USA.
U.S. Appl. No. 13/547,831, Jul. 12, 2012, Perry, II, Jack F.
U.S. Appl. No. 13/547,934, Jul. 12, 2012, Perry, II, Jack F.
U.S. Appl. No. 13/644,041, Oct. 3, 2012, Perry, II, Jack F.
U.S. Appl. No. 13/644,107, Oct. 3, 2012, Perry, II, Jack F.
United States Patent and Trademark Office, Office ACtion for U.S. Appl. No. 13/229,322, May 16, 2013, 15 pages, USA.
United States Patent and Trademark Office, Office Action for U.S. Appl. No. 13/229,376, Jun. 4, 2013, 8 pages, USA.
United States Patent and Trademark Office, Office Action for U.S. Appl. No. 13/644,107, Sep. 26, 2013, 34 pages, USA.
United States Patent and Trademark Office, Office Action for U.S. Appl. No. 13/644,041, Sep. 26, 2013, 33 pages, USA.
United States Patent and Trademark Office, Office Action for U.S. Appl. No. 13/288,359, Nov. 18, 2013, 11 pages, USA.
United States Patent & Trademark Office, Office Action for U.S. Appl. No. 13/644,041, Apr. 30, 2014, 29 pages, USA.
United States Patent and Trademark Office, Office Action for U.S. Appl. No. 13/644,107, Apr. 30, 2014, 31 pages, USA.
United States Patent and Trademark Office, Office Action for U.S. Appl. No. 13/229,376, May 7, 2014, 12 pages, USA.
United States Patent and Trademark Office, Office Action for U.S. Appl. No. 13/229,322, Jul. 16, 2014, 13 pages, USA.
United States Patent and Trademark Office, Office Action for U.S. Appl. No. 13/229,322, Jan. 28, 2014, 11 pages, USA.
United States Patent and Trademark Office, Office Action for U.S. Appl. No. 13/288,364, Mar. 13, 2014, 11 pages, USA.
United States Patent and Trademark Office, Office Action for U.S. Appl. No. 13/547,831, Mar. 20, 2014, 11 pages, USA.
United States Patent and Trademark Office, Office Action for U.S. Appl. No. 13/547,934, Apr. 1, 2014, 14 pages, USA.
United States Patent and Trademark Office, Office Action for U.S. Appl. No. 13/288,359, Apr. 11, 2014, 11 pages, USA.
United States Patent and Trademark Office, Office Action for U.S. Appl. No. 13/288,364, Aug. 26, 2014, 16 pages, USA.
United States Patent and Trademark Office, Office Action for U.S. Appl. No. 13/547,831, Aug. 26, 2014, 17 pages, USA.
United States Patent and Trademark Office, Office Action for U.S. Appl. No. 13/547,934, Aug. 26, 2014, 14 pages, USA.
United States Patent and Trademark Office, Notice of Allowance and Fees Due for U.S. Appl. No. 13/229,376, Aug. 7, 2014, 8 pages, USA.

* cited by examiner

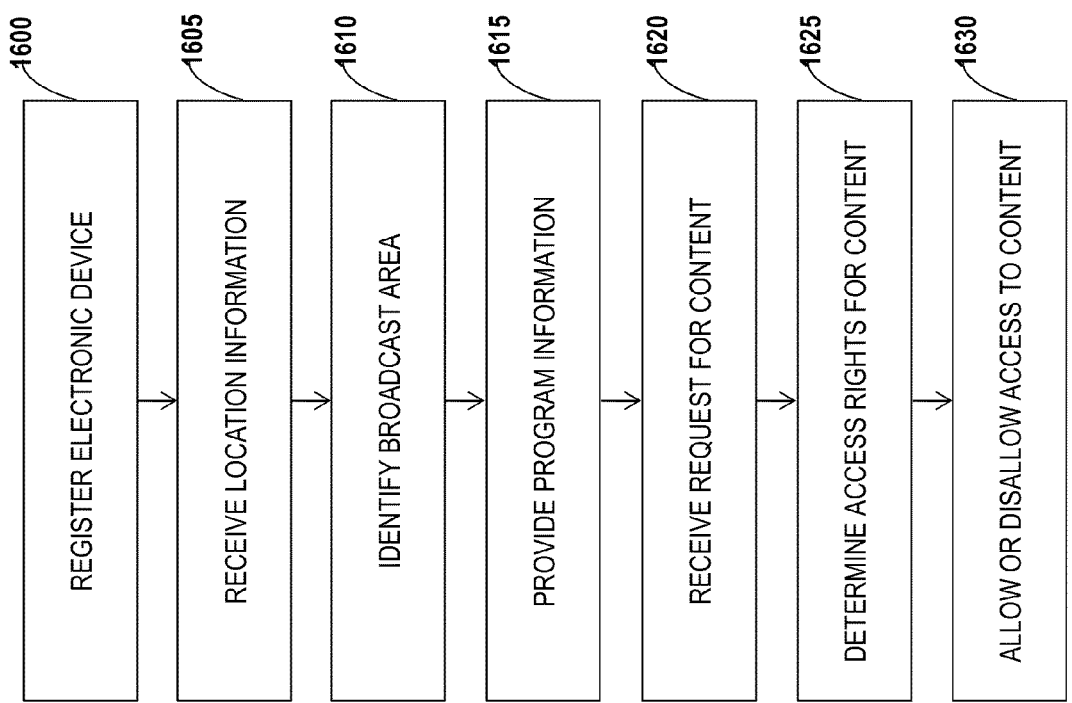

US 8,910,196 B2

BROADCAST AREA IDENTIFICATION AND CONTENT DISTRIBUTION

BACKGROUND

At present, there are over 700 major network television affiliates, 1,600 smaller network television affiliates, and 3,000 community broadcasters across the United States. Currently, these broadcasters are unable to provide their broadcasts, for example, via the Internet because of regulations limiting consumption to users located within their respective broadcast areas. Broadcasters, therefore, need a solution that will allow them to deliver their broadcasts (and/or other content) via the Internet to users located (or having a presence) within or proximate their respective broadcast areas in accordance with various distribution parameters.

BRIEF SUMMARY

In general, embodiments of the present invention provide systems, methods, apparatus, and computer program products for broadcast area identification and content distribution.

In accordance with one aspect, a method for distributing content is provided. In one embodiment, the method comprises (1) after identification of a broadcast area with which an electronic device is associated, receiving a request for content associated with the broadcast area, wherein the request for content is generated from the electronic device; (2) determining whether the request for content is in compliance with one or more distribution parameters; and (3) after determining that the request for content is in compliance with one or more distribution parameters, distributing the content to the electronic device.

In accordance with another aspect, an apparatus comprising at least one processor and at least one memory including computer program code is provided. In one embodiment, the at least one memory and the computer program code may be configured to, with the processor, cause the apparatus to at least (1) after identification of a broadcast area with which an electronic device is associated, receive a request for content associated with the broadcast area, wherein the request for content is generated from the electronic device; (2) determine whether the request for content is in compliance with one or more distribution parameters; and (3) after determining that the request for content is in compliance with one or more distribution parameters, distribute the content to the electronic device.

In accordance with yet another aspect, a computer program product for distributing content is provided. The computer program product may comprise at least one computer-readable storage medium having computer-readable program code portions stored therein, the computer-readable program code portions comprising executable portions configured to (1) after identification of a broadcast area with which an electronic device is associated, receive a request for content associated with the broadcast area, wherein the request for content is generated from the electronic device; (2) determine whether the request for content is in compliance with one or more distribution parameters; and (3) after determining that the request for content is in compliance with one or more distribution parameters, distribute the content to the electronic device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 7-16 are flowcharts illustrating operations and processes that can be used in accordance with various embodiments of the present invention.

DETAILED DESCRIPTION

Figure 1:
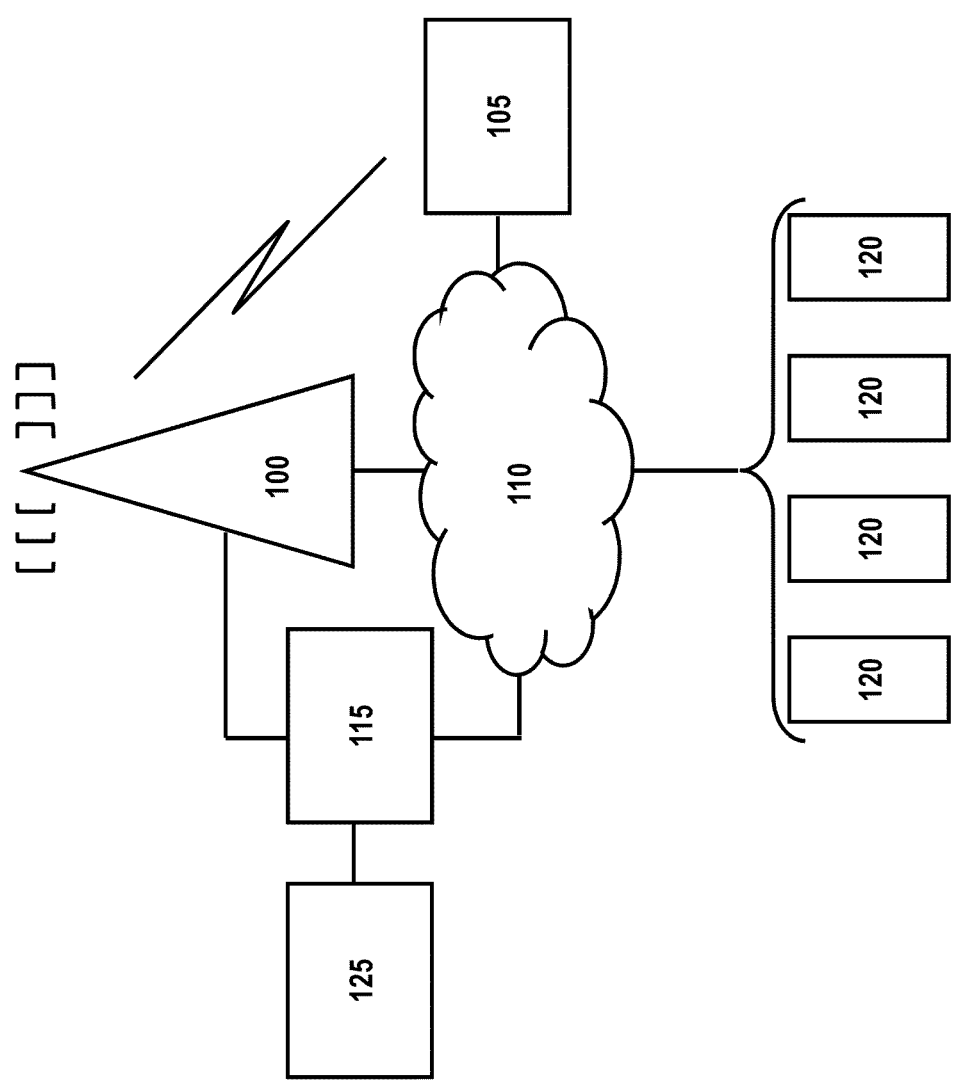
FIG. 1 is an overview of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout. The terms "exemplary" and "illustrative" are used to be examples with no indication of quality level.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that may be used in conjunction with various embodiments of the present invention. As shown in FIG. 1, the system may include one or more broadcast systems 100, one or more local devices 105, one or more networks 110, one or more authentication servers 115, one or more remote devices 120, and one or more content servers 125. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

1. Broadcast System

Embodiments of the present invention may be used in combination with a variety of broadcast systems 100. A broadcast system 100 may be, for example, an over-the-air broadcast system, a cable broadcast system, a satellite broadcast system, and/or a variety of other systems for transmitting broadcasts (see FIG. 6).

a. Over-the-Air Broadcast System

Figure 2:
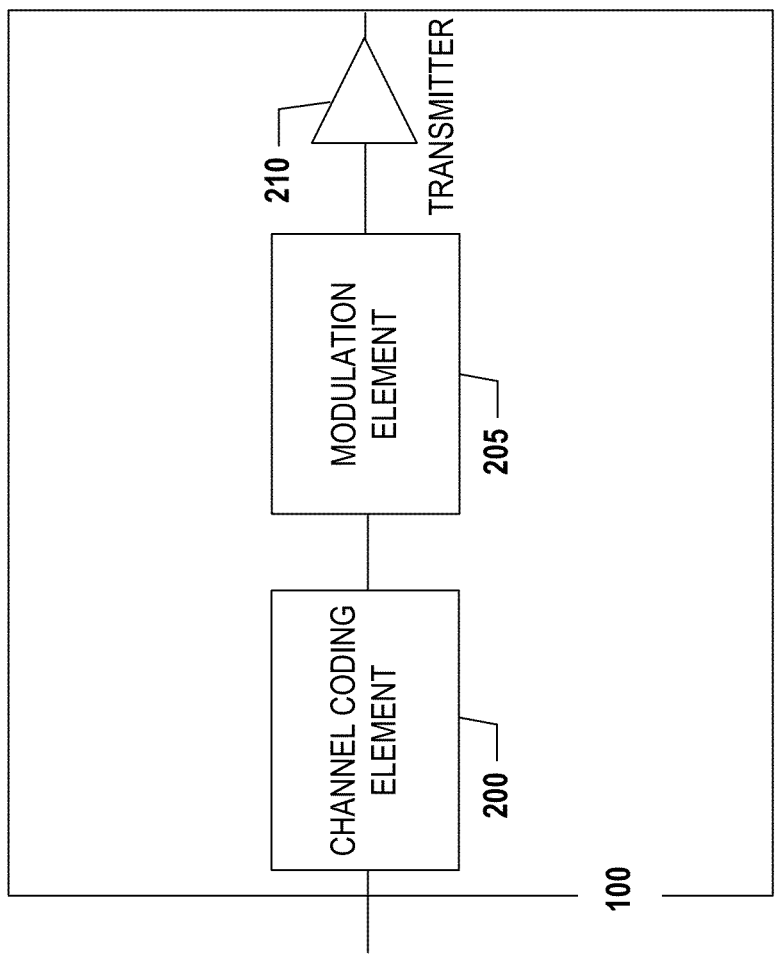
FIG. 2 is an exemplary schematic of a broadcast system according to one embodiment of the present invention.

FIG. 2 provides an exemplary schematic representative of an over-the-air (OTA) broadcast system 100 that can be used in conjunction with embodiments of the present invention. The OTA broadcast system 100 may be owned and/or operated by a broadcaster (e.g., KCRG-TV9) and associated with a broadcast area (e.g., Cedar Rapids, Iowa or the Atlanta, Ga. metropolitan area). Broadcasters may have rights to distribute content within broadcast areas (e.g., designated market area (DMA), zip code, block group, census tract, and government-established area/zone), such as free-to-air television or free-to-view television. As will be recognized, a broadcaster may have one or more OTA broadcast systems 100 depending on the geographic area (e.g., DMA, zip code, block group, census tract, and government-established area/zone) the broadcast area includes. An OTA broadcast system 100 may include various components to broadcast/transmit content and/or data via an OTA broadcast (e.g., an OTA broadcast signal). As shown in FIG. 2, in one embodiment, the OTA broadcast system 100 may include a channel coding element 200, a modulation element 205, and a transmitter 210. Although not shown, the OTA broadcast system 100 may also include various other components, such as audio subsystems, video subsystems, multiplexers, exciters, drivers, amplifiers, network interfaces, processing elements, and/or the like. Via these elements, for instance, the OTA broadcast system 100 can broadcast/transmit OTA broadcasts within a broadcast area (e.g., transmit broadcast signals in a one-to-many configuration). The OTA broadcast system 100 may transmit the broadcast (e.g., OTA broadcast) using a variety of standards and protocols, such as Advanced Television Systems Committee (ATSC), Terrestrial Integrated Services Digital Broadcasting (ISDB-T), Terrestrial Digital Multimedia Broadcasting (T-DMB), Digital Video Broadcasting-Terrestrial (DVB-T), Digital Video Broadcasting-Handheld (DVB-H), Satellite Terrestrial Interactive Multi-service Infrastructure (STiMi), National Television System Committee (NTSC) standards and protocols, and/or the like.

As indicated, the broadcast (e.g., OTA broadcast) may include both content and data. Generally, the term "content" may refer to any type of media, whether audio, video, text, and/or the like. For example, content may include television broadcasts (e.g., live local newscasts, live sporting events, live cultural events), television programs (e.g., The Office), movies (e.g., video-on-demand (VOD)), datacasts, music, images, videos, text, webpages, and/or the like. The term "data" may refer to any type of data, including ancillary data, control data, conditional access control data, data associated with program audio and/or video services (e.g., closed captioning), and/or the like.

Although not shown, the OTA broadcast system 100 (or other broadcast facility located proximate or remote from the OTA broadcast system 100) may also comprise one or more components for providing content to local and remote devices 105, 120 via a network such as the Internet. These components may include VOD systems, Internet broadcast systems, content servers, and/or the like. Thus, via such components, a broadcaster can provide a variety of content (e.g., linear and non-linear media) via the Internet to local and remote devices 105, 120.

It will be appreciated that one or more of the broadcast system's 100 components and other broadcaster components may be located remotely from one another. For example, a broadcaster may have one or more content servers 125 located remotely from the broadcast system. Furthermore, one or more of the components may be combined and additional components performing functions described herein may be included.

b. Cable Broadcast System

Although not shown, a cable broadcast system (also referred to as a broadcast system) may be used with embodiments of the present invention. A cable broadcast system may include various components to broadcast/transmit content and/or data via the cable provider's broadcast system to the cable provider's subscribers. For example, in various embodiments, the cable broadcast system may include a network operations center, a cable modem termination system, and a headend to transmit cable broadcasts (e.g., digital cable signals) through the cable provider's distribution network to local devices 105, which may include set-top boxes and/or cable modems. Thus, the set-top boxes (and/or local devices 105) may communicate with a headend over a distribution network. For example, the headend may route messages (e.g., subscriber inputs) received from the set-top boxes (and/or local devices 105) to various components of the cable provider's broadcast system and broadcast/transmit content (e.g., selected programs) to the set-top boxes.

To perform such functions, the cable broadcast system may include various components, such as audio subsystems, video subsystems, multiplexers, switches, encoders satellite receivers and antennae, network interfaces, decoding elements, encoding elements, processing elements, transmitting elements, modulation elements, and/or the like. The cable broadcast system may be capable of receiving and transmitting content (e.g., via a content server 125) and data using a variety of standards and protocols such as those described with regard to the OTA broadcast system 100, including data over cable service interface specification (DOCSIS).

c. Satellite Broadcast System

Although not shown, a satellite broadcast system (also referred to as a broadcast system) may be used with embodiments of the present invention. A satellite broadcast system may include various components to broadcast/transmit content and/or data via the satellite provider's broadcast system to the satellite provider's subscribers. For example, in various embodiments, the satellite broadcast system may include uplink facilities (with transmitting antennae), satellites (with transponders), receiving satellite dishes, and/or local devices 105. Thus, the satellite broadcast system can broadcast/transmit satellite broadcasts to subscribers, such as direct broadcast satellite (DBS), television receive only (TVRO), and/or the like. The satellite broadcast system may be capable of receiving and transmitting content (including via content servers 125) and data using a variety of standards and protocols, such as those described with regard to the OTA broadcast system 100.

2. Local Device

Figure 3:
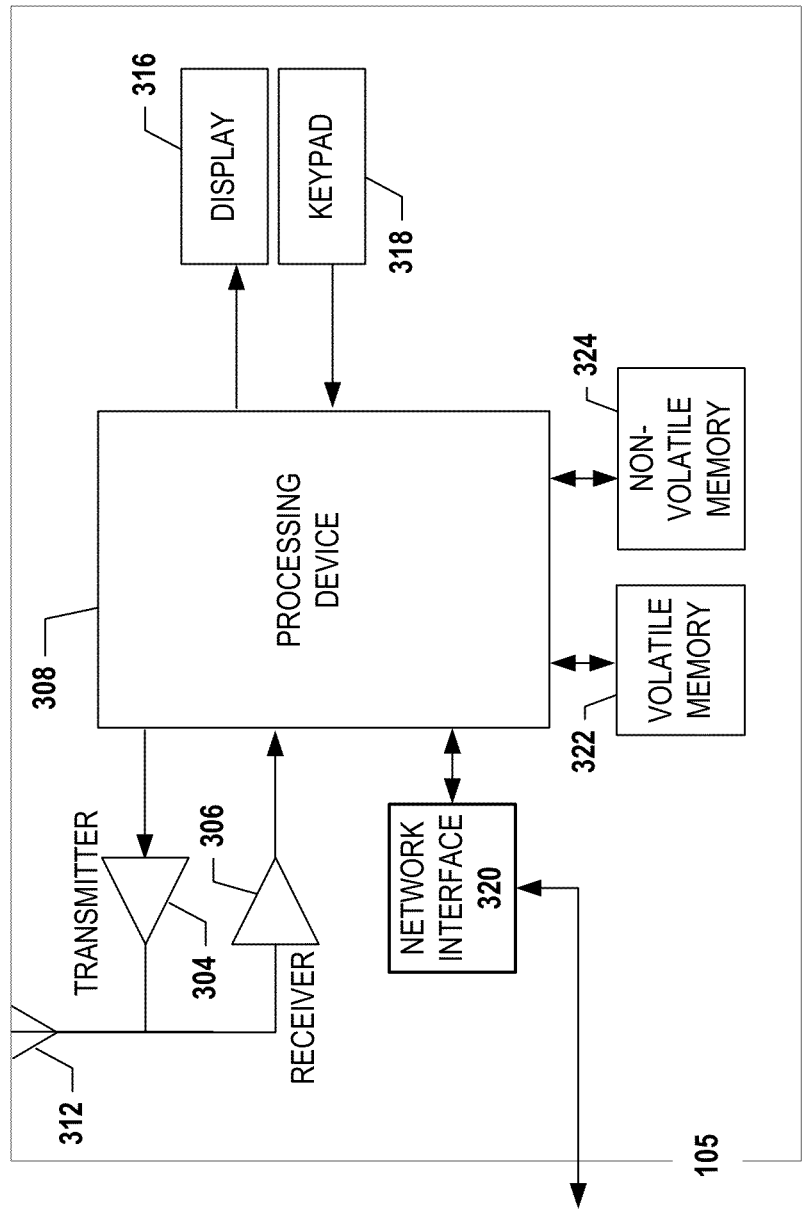
FIG. 3 is an exemplary schematic of a local device according to one embodiment of the present invention.

FIG. 3 provides an exemplary schematic representative of a local device 105 (e.g., an electronic device) that can be used in conjunction with embodiments of the present invention, such as a computing device or television. In general, the term "local device" may refer to, for example, an electronic device located within a specific broadcast area (e.g., an electronic device located within a broadcaster's broadcast area, which may be a town, a city, a metropolitan area, a state, a region, a country, and/or the like). As shown in FIG. 3, the local device 105 may include an antenna 312, a transmitter 304, a receiver 306, a network interface 320, tuner or tuner card (not shown), and a processing device 308 (e.g., a processor, controller, and/or the like) that provides signals to the transmitter 304 (and/or network interface 320) and receives signals from receiver 306 (and/or network interface 320).

The signals provided to the transmitter 304 (and/or network interface 320) and received from the receiver 306 (and/or network interface 320) may include signaling information/data in accordance with an air interface standard of applicable wireless systems. In this regard, the local device 105 may be capable of operating with one or more air interface standards, communication protocols, modulation types, and access types. More particularly, the local device 105 may operate in accordance with any of a number of second-generation (2G), third-generation (3G), fourth-generation (4G), ATSC, ISDB-T, T-DMB, DVB-T, DVB-H, STiMi standards and protocols, and/or the like. Further, for example, the local device 105 may operate in accordance with any of a number of different wireless networking techniques, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. The local device 105 may also operate in accordance with a variety of wired networking standards and protocols. Via these communication standards and protocols, the local device 105 can communicate with the authentication server 115, for example, and/or receive broadcasts/transmissions from the broadcast system 100. The local device 105 can also download changes, add-ons, and updates, for instance, to its firmware, software (e.g., including modules), and operating system.

The local device 105 may also comprise a user interface (that can include a display 316 coupled to a processing device 308) and/or a user input interface (coupled to the processing device 308). The user input interface can comprise any of a number of devices allowing the local device 105 to receive input and/or data, such as a keypad 318, a touch display, voice or motion interfaces, or other input device such as a remote control. The local device 105 can also include volatile memory 322 and/or non-volatile memory 324, which can be embedded and/or may be removable. For example, the non-volatile memory may be embedded or removable multimedia memory cards (MMCs), secure digital (SD) memory cards, Memory Sticks, electrically erasable programmable read-only memory (EEPROM), flash memory, hard disk, or the like. The memory can store any of a number of pieces or amount of information/data and data used by the local device 105 to implement the functions of the local device 105. The memory can also store content, such as program code for an application and/or other programs.

In one embodiment, the local device 105 may be adapted to determine its location by, for example, acquiring location information/data, such as latitude, longitude, altitude, and/or geocode information/data. In one embodiment, a GPS module of a local device 105 can acquire information/data, sometimes known as ephemeris information/data, by identifying the number of satellites (e.g., Low Earth Orbit (LEO) satellite system or a Department of Defense (DOD) satellite system) in view and the relative positions of those satellites. Additionally or alternatively, the local device 105 may determine its location via triangulation in connection with various communication points (e.g., cellular towers or Wi-Fi access points) positioned at various locations throughout a geographic area.

3. Authentication Server

Figure 4:
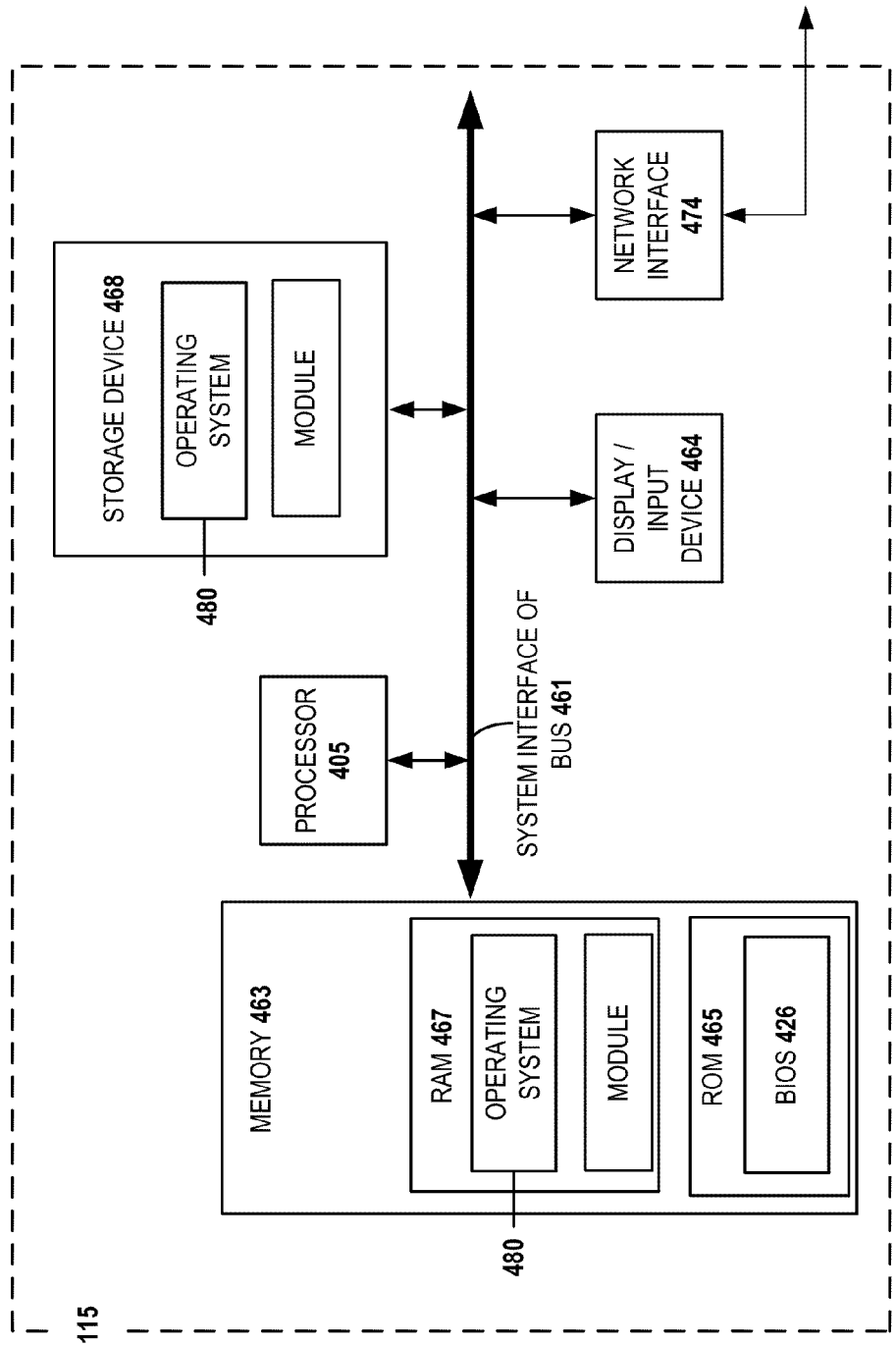
FIG. 4 is an exemplary schematic of an authentication server according to one embodiment of the present invention.

FIG. 4 provides an exemplary schematic of an authentication server 115 according to one embodiment of the present invention. In general, the term "authentication server" may refer to, for example, any computer, computing device, mobile phone, desktop, notebook or laptop, distributed system, broadcast system, server, blade, gateway, switch, or other processing device adapted to perform the functions described herein. As will be understood from this figure, in this embodiment, the authentication server 115 may include a processor 405 that communicates with other elements within the authentication server 115 via a system interface or bus 461. The processor 405 may be embodied in a number of different ways. For example, the processor 405 may be embodied as a processing element, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 405 may be configured to execute instructions stored in the device memory or otherwise accessible to the processor 405. As such, whether configured by hardware or other methods, or by a combination thereof, the processor 405 may represent an entity capable of performing operations according to embodiments of the present invention while configured accordingly. A display device/input device 464 for receiving and displaying content and/or data may also be included in the authentication server 115. This display device/input device 464 may be, for example, a keyboard or pointing device that is used in combination with a monitor. The authentication server 115 further may include memory 463, which may include both read only memory (ROM) 465 and random access memory (RAM) 467. The authentication server's ROM 465 may be used to store a basic input/output system (BIOS) 426 containing the basic routines that help to transfer information/data to the different elements within the authentication server 115.

In addition, in one embodiment, the authentication server 115 may include at least one storage device 468, such as a hard disk drive, a CD drive, and/or an optical disk drive for storing information/data on various computer-readable media. The storage device(s) 468 and its associated computer-readable media may provide nonvolatile storage. The computer-readable media described above could be replaced by any other type of computer-readable media, such as embedded or removable MMCs, SD memory cards, Memory Sticks, EEPROM, flash memory, hard disk, or the like. Additionally, each of these storage devices 468 may be connected to the system bus 461 by an appropriate interface.

Furthermore, a number of executable instructions, applications, scripts, program modules, and/or the like may be stored by the various storage devices 468 and/or within RAM 467. Such executable instructions, applications, scripts, program modules, and/or the like may include an operating system 480 and one or more modules. These modules may control certain aspects of the operation of the authentication server 115 with the assistance of the processor 405 and operating system 480—although their functionality need not be modularized. In addition to the program modules, the authentication server 115 may store or be connected to one or more databases with one or more tables stored therein.

Also located within the authentication server 115, in one embodiment, is a network interface 474 for interfacing with various computing entities, including the broadcast system 100. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, DOCSIS, or any other wired transmission protocol. Similarly, the authentication server 115 may be configured to communicate via wireless external communication networks using any of a variety of protocols, such as 802.11, general packet radio service (GPRS), wideband code division multiple access (W-CDMA), or any other wireless protocol (including those described above). Via these communication standards and protocols, the authentication server 115 can communicate with the local devices 105, remote devices 120, and broadcast systems 100. The authentication server 115 may also include receivers (not shown), transmitters (not shown), and other components (not shown) capable of operating in accordance with ATSC, ISDB-T, T-DMB, DVB-T, DVB-H, STiMi standards and protocols, and/or the like.

It will be appreciated that one or more of the authentication server's 115 components may be located remotely from other authentication server 115 components. Furthermore, one or more of the components may be combined and additional components performing functions described herein may be included in the authentication server 115. Moreover, the physical location and operation of the authentication server 115 may vary. For example, in one embodiment, the authentication server 115 may be operated by a party independent of the broadcaster and located remote from the broadcast system 100. In another embodiment, the authentication server 115 may be operated by a broadcaster, with the authentication server 115 being located at a broadcast facility such as the broadcast system 100. Moreover, there may be multiple authentication servers 115 in geographically distinct locations.

4. Remote Device

Figure 5:
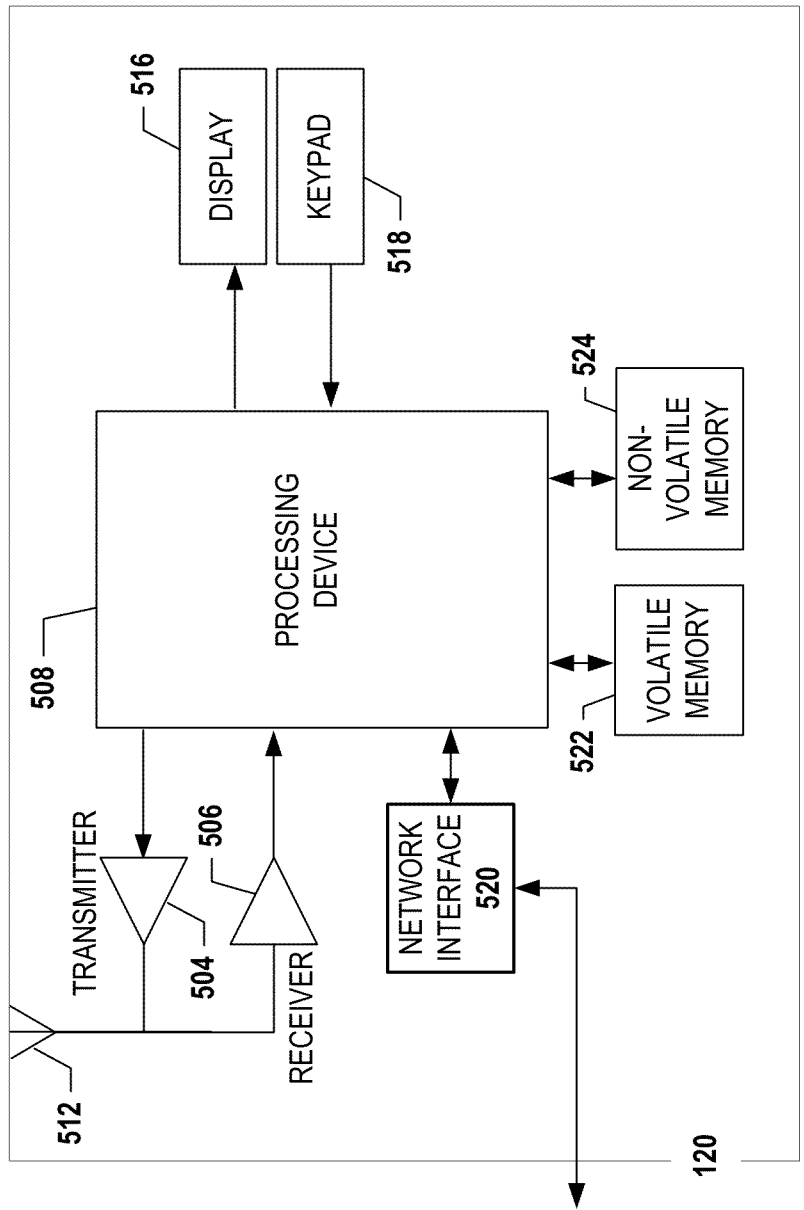
FIG. 5 is an exemplary schematic of a remote device according to one embodiment of the present invention.

FIG. 5 provides an exemplary schematic representative of a remote device 120 (e.g., an electronic device) that can be used in conjunction with embodiments of the present invention, such as a computing device or television. In general, the term "remote device" may refer to, for example, an electronic device located outside a specific broadcast area when attempting to access content associated with the broadcast area (e.g., an electronic device located outside a broadcaster's broadcast area when attempting to access the broadcaster's content). Although, in certain embodiments, the remote device 120 may also be located within a broadcaster's broadcast area when attempting to access the broadcaster's content. As shown in FIG. 5, the remote device 120 may include an antenna 512, a transmitter 504, a receiver 506, a network interface 520, tuner or tuner card (not shown), and a processing device 508 (e.g., a processor, controller, and/or the like) that provides signals to and receives signals from the transmitter 504 (and/or network interface 520) and receiver 506 (and/or network interface 520).

The signals provided to the transmitter 504 (and/or network interface 520) and received from the receiver 506 (and/or network interface 520) may include signaling information/data in accordance with an air interface standard of applicable wireless systems (or wired systems). For example, the remote device 120 may be capable of operating with one or more standards, communication protocols, modulation types, and access types as described above with respect to the local device 105.

The remote device 120 may also comprise a user interface (that can include a display 516 coupled to a processing device 508) and/or a user input interface (coupled to the processing device 508). The user input interface can comprise any of a number of devices allowing the remote device 120 to receive input and/or data, such as a keypad 518, a touch display, voice or motion interfaces, or other input device. The remote device 120 can also include volatile memory 522 and/or non-volatile memory 524, which can be embedded and/or may be removable as described above with respect to the local device 105. The memory can store any of a number of pieces or amount of information/data used by the remote device 120, such as program code for an application and/or other programs.

III. Example 1

Broadcast Area Identification and Authentication

Although portions of following describe an implementation using an OTA broadcast system, embodiments of the present invention may use a variety of broadcast systems, including a cable broadcast system, a satellite broadcast system, and/or a variety of other systems for transmitting broadcasts. Thus, the described examples for broadcast area identification/determination are provided for illustrative purposes only and should not be taken in any way as limiting embodiments of the present invention to the examples provided. As indicated, a broadcast area may correspond to one or more DMAs, which can be used to determine/identify the television offerings in the broadcast area. A broadcast area, though, may also correspond to a variety of other types of broadcast areas, such as block groups, zip codes, census tracts, government-established areas/zones, cartographic levels, and/or the like.

1. User Registration

Figure 7:
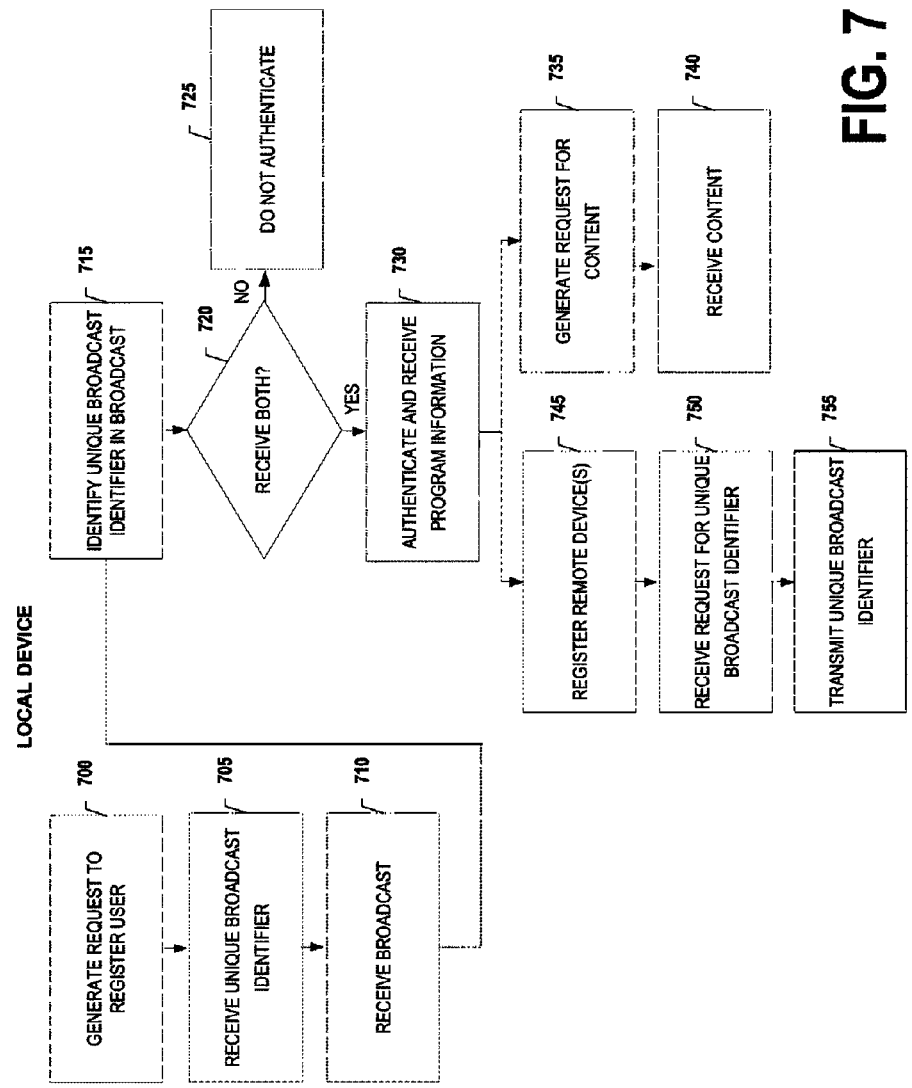
Figure 10:
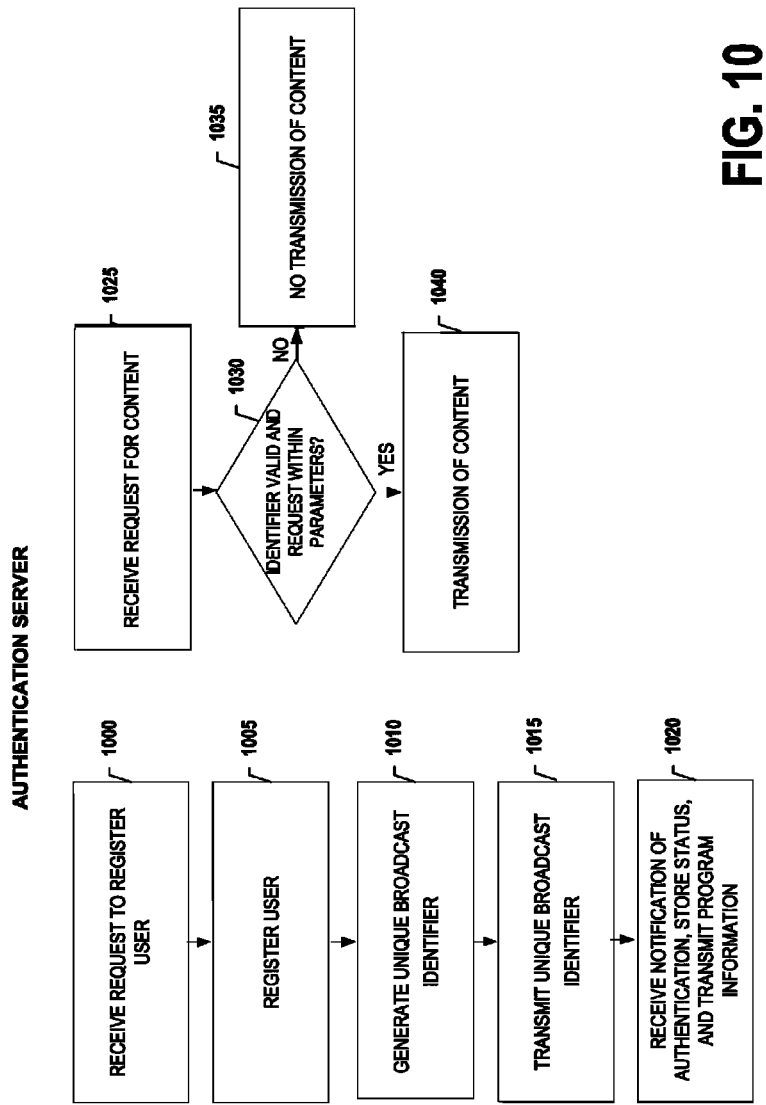

In one embodiment, as shown in FIGS. 7 and 10, the process may begin by a local device 105 (e.g., via a user operating a local device 105) generating a request to register a user to access a broadcaster's content via a network such as the Internet (Block 700 of FIG. 7). The request may be a request, for example, to register the user directly with a specific broadcaster (e.g., KCRG-TV9, Comcast, DISH Network) or an independent third party representing multiple broadcasters (e.g., www.syncbak.com). In one embodiment, the request to register the user may be executed via a module, program, browser, or application that has been downloaded or preinstalled on the local device 105. In another embodiment, the request to register the user may be generated via a webpage of a broadcaster or an independent third party.

In one embodiment, the request to register the user may include user information/data. The user information/data may include a variety of information/data associated with the user and/or the local device 105. For example, the user information/data may include (a) the user's first and last name, (b) the user's address, (c) the user's zip code, (d) the user's telephone number, (e) a username, (f) a charge card number, (g) a local device identifier (e.g., Subscriber Identity Module (SIM) number, Media Access Control (MAC) address, International Mobile Subscriber Identity (IMSI) number, Internet Protocol (IP) address, mobile equipment identifier (MEID)), and/or (h) the like. The user information/data may be used to uniquely determine/identify the user and/or the local device 105.

As shown in FIG. 10, in one embodiment, the request to register the user is sent to and received by an authentication server 115 (Block 1000 of FIG. 10). As previously discussed, the physical location and operation of the authentication server 115 may vary. For example, the authentication server 115 may be operated by (a) a broadcaster or (b) an independent third party. Irrespective of ownership and/or operation, in response to (e.g., after) receiving the request to register the user, the authentication server 115 can create a user account with the user information/data and electronically store at least a portion of the user information/data in association with the user account (Block 1005 of FIG. 10).

It should be noted that in various embodiments, the user account may be used to not only store information/data associated with the user and the local device 105, but information/data associated with additional local devices 105 (e.g., a personal computer and a television in the user's home) and/or remote devices 120. The user account and/or user information/data may be used to provide content to the local device 105 and/or remote device 120 via the Internet (or other network). In one embodiment, to provide content from the broadcaster to the local device 105 and/or remote device 120 via the Internet, for example, the local device 105 can be used to determine/identify the appropriate broadcast area (e.g., DMA) in which it is located and be authenticated as being within or proximate a broadcaster's broadcast area (e.g., a town, a city, a metropolitan area, a state, a region, a country, and/or the like).

As will be recognized, a variety of techniques and approaches can be used to adapt to various needs and circumstances. For example, certain embodiments contemplate registration-free implementations. Similarly, other embodiments contemplate silent or background registrations.

2. Unique Broadcast Identifier Generation

In one embodiment, the identification and authentication process may include the generation of a unique broadcast identifier corresponding to the local device 105. In embodiment, the authentication sever 115 may generate a unique broadcast identifier corresponding to the local device 105 based at least in part on, for example, the user information/data it receives from the local device 105 (Block 1010 of FIG. 10). In another embodiment, the broadcast system 100 may generate a unique broadcast identifier associated with the local device 105 based at least in part on user information/data stored in association with the user account.

In one embodiment, as described, the user information/data corresponding to the local device 105 can be used to uniquely identify the user and/or the corresponding local device 105. As indicated, the user information/data may include (a) the user's first and last name, (b) the user's address, (c) the user's zip code, (d) the user's telephone number, (e) a username (f) a charge card number, (g) a local device identifier, e.g., MAC address or IP address, and/or (h) the like. Thus, the unique broadcast identifier generated by the authentication server 115 can also be used to uniquely determine/identify the user, the local device 105, and/or the content (e.g., channels, affiliates, or broadcasters) for which the local device 105 is being or has been authenticated.

Figure 17A:
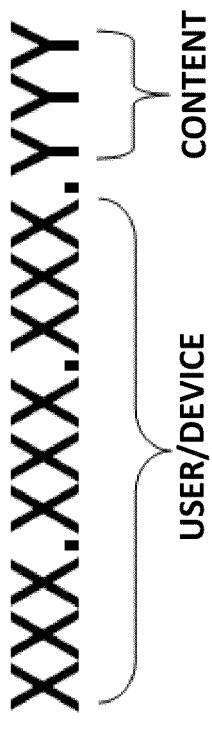
FIGS. 17A and 17B show unique broadcast identifiers according to one embodiment of the present invention.
Figure 17B:
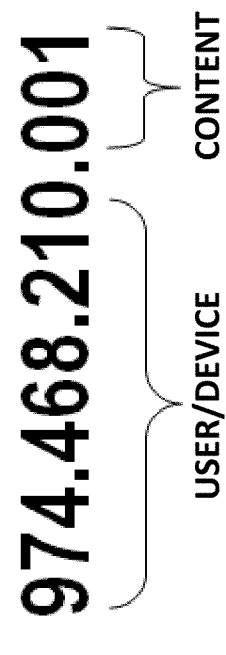

In a particular embodiment, the unique broadcast identifier may be, for example, a data string comprising 12 characters. As shown in FIGS. 17A and 17B, the first nine characters of the unique broadcast identifier may comprise a user/local device portion. The user/local device portion may be used to uniquely determine/identify the user and/or the local device 105. For instance, 974.468.210 may be the first nine characters of the unique broadcast identifier that uniquely identify the user and/or the local device 105. The last three characters of the unique broadcast identifier may comprise a content portion. The content portion of the unique broadcast identifier may be used to determine/identify the content (e.g., channels, affiliates, or broadcasters) for which the local device 105 is being or has been authenticated. For example, 001 may be the last three characters used in the unique broadcast identifier to determine/identify the content (e.g., channels, affiliates, or broadcasters). Thus, continuing with the above example, 001 may be used to represent KCRG-TV9 in Cedar Rapids, Iowa. Accordingly, if the local device 105 is authenticated with a unique broadcast identifier of 974.468.210.001, the unique broadcast identifier may be used to indicate that the user and/or local device 105 have access rights to KCRG-TV9's content via the Internet (or other network).

As will be recognized, when authenticating multiple local devices 105, the authentication server 115 can generate a unique broadcast identifier for each local device 105 being authenticated. The local devices 105 may be located in any number of different broadcast areas. For example, in one embodiment, the authentication server 115 (or multiple authentication servers 115) may create unique broadcast identifiers for local devices 105 in (a) Atlanta, Ga., (b) Clearwater, Fla., (c) Cedar Rapids, Iowa, (d) Seattle, Wash., and/or (e) Los Angeles, Calif. In another embodiment, the local devices 105 may also be within the (a) same broadcast area (e.g., Atlanta, Ga.) and (b) same residence or business. For example, multiple user accounts may be associated with a single residential or business location. Thus, in one embodiment, the authentication server 115 (or multiple authentication servers 115) may include or be in communication with a database storing the various unique broadcast identifiers in association with the respective user accounts.

In one embodiment, the unique broadcast identifier may be used as a key, for example, to access any premium content for which the user corresponding to the user account has paid. For example, given that each broadcaster in the United States may have 19.4 megabits per second of spectrum available for broadcast, the broadcaster may be able to simultaneously provide (a) content that is free for user consumption and (b) premium content for which the user pays a fee (e.g., a microtransaction fee) to access.

Figure 9:
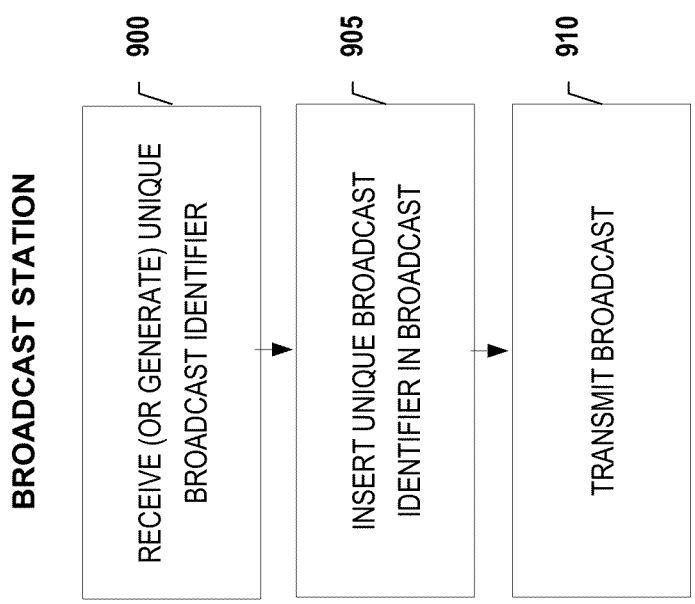

In one embodiment, after generating the unique broadcast identifier, the authentication server 115 transmits the unique broadcast identifier to both the broadcast system 100 and the local device 105 (Block 1015 of FIG. 10). As indicated in Block 705 of FIG. 7, the local device 105 receives the unique broadcast identifier from the authentication server 115 and stores it, for example, in memory. Similarly, as indicated in Block 900 of FIG. 9, the broadcast system 100 can receive the unique broadcast identifier from the authentication server 115 for broadcast/transmission via a broadcast.

3. Broadcast Area Identification and Authentication

As indicated, the (a) local device 105 can receive the unique broadcast identifier from the authentication server 115 and (b) broadcast system 100 can receive the unique broadcast identifier from the authentication server 115. In one embodiment, as shown in Block 905 of FIG. 9, the broadcast system 100 can then insert the unique broadcast identifier into a broadcast (e.g., OTA broadcast, DBS broadcast, and/or cable broadcast). This may be executed, for example, using the program and system information protocol (PSIP) delivery schema or any of a variety of other approaches and techniques. For example, the broadcast system 100 may insert the unique broadcast identifier into the broadcast (e.g., OTA broadcast, DBS broadcast, and/or cable broadcast) as an ancillary data stream. As shown in Block 910 of FIG. 9, after inserting the unique broadcast identifier into the broadcast, the broadcast system 100 may broadcast/transmit the broadcast (e.g., OTA broadcast, DBS broadcast, and/or cable broadcast). The broadcast system 100 can broadcast/transmit the broadcast (e.g., OTA broadcast, DBS broadcast, and/or cable broadcast) as a one-to-many broadcast. As will be recognized, the broadcast (e.g., OTA broadcast, DBS broadcast, and/or cable broadcast) may be relayed, repeated, or otherwise transmitted via multiple broadcast systems 100 or devices within the broadcast area (e.g., DMA, zip code, block group, census tract, and government-established area/zone).

As will be recognized, when authenticating multiple local devices 105, the broadcast system 100 may broadcast/transmit a burst, for example, with numerous unique broadcast identifiers, each unique broadcast identifier uniquely identifying an associated local device 105 and corresponding content access rights. Thus, for instance, the broadcast system 100 may periodically, continuously, and/or regularly broadcast/transmit the unique broadcast identifiers of registered users regardless of their location with respect to the broadcast system 100. For example, in one embodiment, a broadcaster in Atlanta, Ga. may periodically, continuously, or regularly broadcast/transmit the unique broadcast identifiers for all users in Georgia, the Southeast, and/or the United States. Thus, for instance, KCRG-TV9 in Cedar Rapids, Iowa may broadcast unique identifiers for local devices 105 located in (a) Atlanta, Ga., (b) Clearwater, Fla., (c) Cedar Rapids, Iowa, (d) Seattle, Wash., and/or (e) Los Angeles, Calif. As will be recognized, a variety of approaches and techniques may be used.

Figure 6:
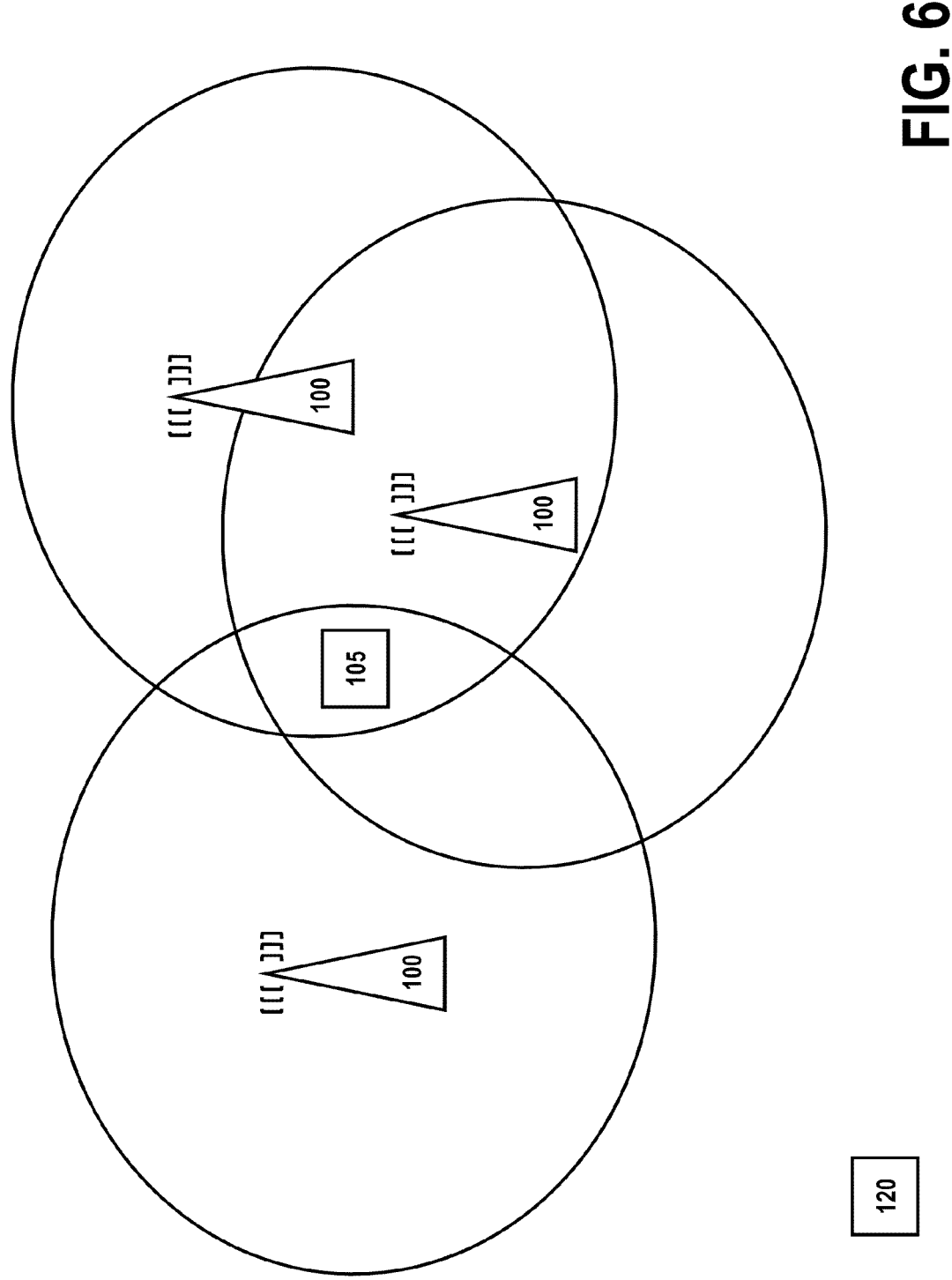
FIG. 6 shows broadcast areas served by broadcast systems according to one embodiment of the present invention.

In one embodiment, with regard to OTA broadcasts, as shown in FIG. 6, a local device 105 may receive OTA broadcasts from any number of broadcast systems 100. For instance, a local device 105 located in Cedar Rapids, Iowa may simultaneously receive 12-15 OTA broadcasts from various broadcasters. In one embodiment, each OTA broadcast may comprise any number of unique broadcast identifiers corresponding to local devices 105 from one or more broadcast areas. Thus, at any time, a local device 105 may receive many OTA broadcasts from various broadcast systems 100, with each OTA broadcast comprising any number of unique broadcast identifiers (and perhaps duplicate unique broadcast identifiers).

In one embodiment, as shown in Block 710 of FIG. 7, as a result of the broadcast system 100 broadcasting/transmitting the broadcast (e.g., OTA broadcast, DBS broadcast, and/or cable broadcast) in the broadcast area (e.g., DMA, zip code, block group, census tract, and government-established area/zone), the local device 105 can receive the broadcast (e.g., OTA broadcast, DBS broadcast, and/or cable broadcast). In part, this may be possible because the local device 105 is located within or proximate the broadcaster's broadcast area. As the local device 105 receives the broadcast, the local device 105 scans for and identifies (e.g., via a downloaded or preinstalled module, program, or application) any unique broadcast identifiers corresponding to the user and/or the local device 105 (Block 715 of FIG. 7). For example, using the user information/data associated with the local device 105 as a key, for example, the downloaded/preinstalled module, program, or application can be used to identify (e.g., translate) any unique broadcast identifiers that correspond to the user or local device 105. As will be recognized, a variety of approaches and techniques may be used.

In various embodiments, with regard to OTA broadcasts, an attenuated OTA broadcast (e.g., an attenuated signal) may still be received and be used to identify the unique broadcast identifier therein because the signal carrying the OTA broadcast need only be sufficient to allow identification of the unique broadcast identifier. In other words, as the OTA broadcast reaches the local device 105, the signal need only be sufficient for the local device 105 to recover the data, not the content (e.g., audio and/or video). This approach may allow for local devices 105 that were considered out of range to recover the content of an OTA broadcast to identify the unique broadcast identifier therein.

In one embodiment, after identifying the unique broadcast identifier corresponding to the user and/or local device 105 in the broadcast, the local device 105 can proceed with authentication. In one embodiment, to be authenticated, the local device 105 may need to receive the unique broadcast identifier (a) from the authentication server 115 and (b) via the broadcast (e.g., OTA broadcast, DBS broadcast, and/or cable broadcast) from the broadcast system 100 (Block 720 of FIG. 7). Practically, the local device 105 can receive the unique broadcast identifier from the authentication server 115 and temporarily store it in memory. The local device 105 can also scan for and identify the unique broadcast identifier corresponding to the user or local device 105 in the broadcast. In one embodiment, in response to (a) receiving the unique broadcast identifier from both the authentication server 115 and the broadcast system 100 and (b) confirming/determining that the unique broadcast identifiers are the substantially same (e.g., if the condition is equal), the local device 105 can be authenticated (Block 730 of FIG. 7). If, however, the local device 105 does not receive substantially the same unique broadcast identifier from the authentication server 115 and the broadcast system 100 via the broadcast (e.g., if the condition is not equal), the local device 105 may not be authenticated (Block 725 of FIG. 7).

In one embodiment, as part of the local device 105 being authenticated, the local device 105 may store the unique broadcast identifier for use in accessing content from the broadcaster via the Internet (or other network). Moreover, the local device 105 (e.g., via a downloaded or preinstalled module, program, or application) can generate and transmit a notification to the authentication server 115 regarding the local device's 105 authentication status. The authentication status may indicate, for example, whether and for which channels the user and/or local device 105 have been authenticated. In response to (e.g., after) receiving the notification from the local device 105, the authentication server 115 can store the local device's 105 authentication status in association the user account corresponding to the user and/or the local device 105 (Block 1020 of FIG. 10). As will be recognized, at any given time, the authentication server 115 may store or have access to the authentication status of any number of local devices 105. For ease in understanding various embodiments of the present invention, this approach for broadcast area identification and authentication may be referred to generically as "in-area: level 1."

As will be recognized, when authenticating multiple local devices 105, the authentication server 115 can generate a unique broadcast identifier for each local device 105 being authenticated. Thus, at any given time, a broadcast system 100 may broadcast/transmit a burst with numerous unique broadcast identifiers, each uniquely identifying an associated local device 105 and corresponding content access rights. Similarly, a local device 105 may receive numerous unique broadcast identifiers, but only identify (e.g., be able to translate) the unique broadcast identifiers to which it corresponds.

The preceding describes processes for identifying a broadcast area (e.g., DMA, zip code, block group, census tract, and government-established area/zone) and authenticating a local device 105 as being within the broadcast area (e.g., DMA, zip code, block group, census tract, and government-established area/zone). In various embodiments, this may allow a broadcaster to confirm that the local device 105 is within or proximate the broadcaster's broadcast area. Thus, after the local device 105 has been authenticated, content can be provided to the local device 105 via a network such as the Internet while, for example, complying with various distribution parameters.

Figure 18:
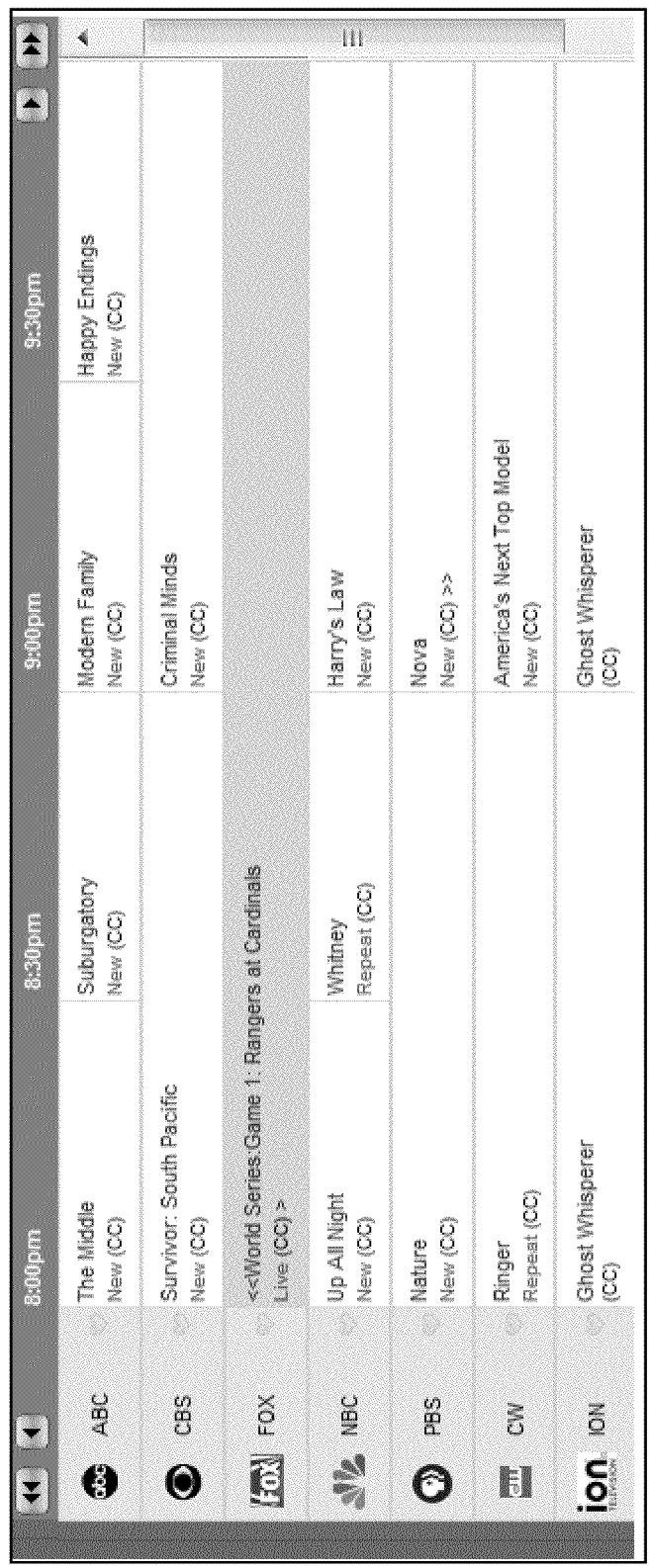
FIGS. 18 and 19 show exemplary input and output (including user interactions) that can be produced in accordance with various embodiments of the present invention.
Figure 19:
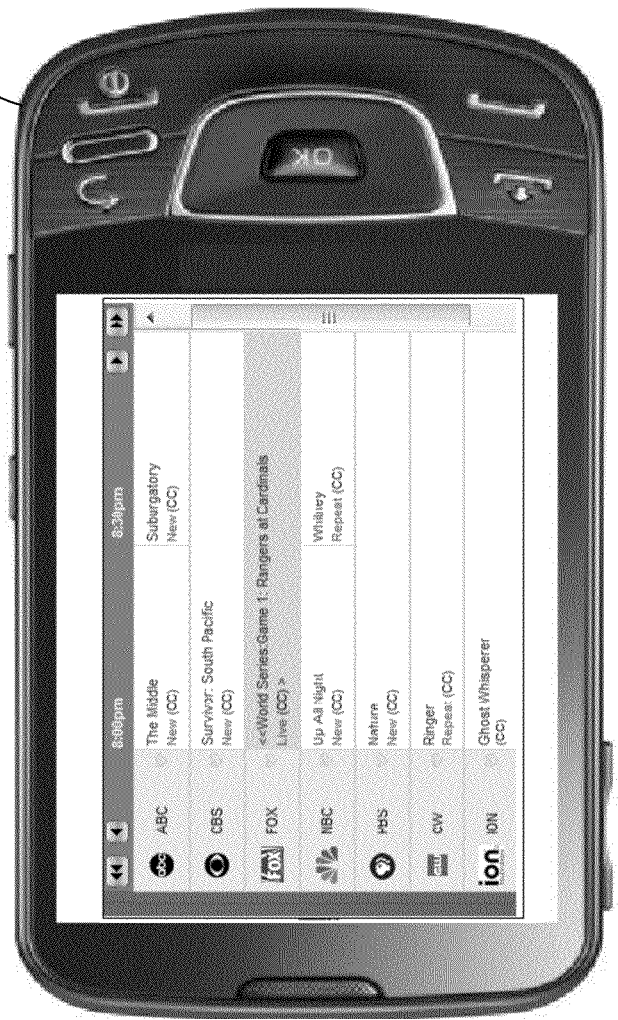

In one embodiment, the described identification and authentication techniques also allow the local device 105 (or other computing entity) to determine what channels (or other offerings) it can receive. For example, after identifying the appropriate broadcast area (e.g., DMA, zip code, block group, census tract, and government-established area/zone) for an electronic device (e.g., local device 105) and/or being authenticated, the authentication server 115 can provide program information/data for the broadcast area in which the local device 105 is located. As shown in FIGS. 18 and 19, the program information/data may include program guides and/or program listings of live content (including linear content) and/or on-demand content, for example, that are available for consumption via the local device 105. For instance, as seen in these figures, this exemplary program information/data includes content available during the 8:00 pm and/or 9:00 pm hours on ABC, CBS, FOX, NBC, PBS, The CW, and ION.

Operatively, to receive such program information, the local device can request program information/data from various computing entities, including the authentication server 115, a broadcast server, a content server 125, or a search engine. As will be recognized, an electronic device (e.g., local device 105 or remote device 120) can refresh such program information/data on a periodic, regular, and/or continuous basis through a variety of other approaches and techniques.

4. Content Access for Local Device

In one embodiment, after the appropriate broadcast area (e.g., DMA, zip code, block group, census tract, and government-established area/zone) has been identified and the local device 105 has been authenticated as being associated with the broadcast area (e.g., DMA, zip code, block group, census tract, and government-established area/zone), the local device 105 can access content (e.g., via a user operating the local device 105) via the Internet, for example. As discussed, the content may include television broadcasts, television programs, movies, datacasts, music, images, videos, text, webpages, and/or the like. In one embodiment, the content may be stored and distributed via one or more content servers 125, one or more broadcast servers, and/or other computing entities in response (e.g., after) to an appropriate notification from the authentication server 115. In such an embodiment, the authentication server 115 may store one or more distribution parameters for distributing the different content and evaluating requests for content for compliance with the distribution parameters. In another embodiment, the authentication server 115 may receive content for distribution from one or more content servers 125 and/or one or more broadcast servers. In such an embodiment, the authentication server 115 may store the content and tag (e.g., include metadata) the different content with the corresponding distribution parameters. Then, the authentication server 115 can evaluate requests for content for compliance with the distribution parameters and distribute the content accordingly.

In one embodiment, distribution parameters can be defined by various parties, including the broadcaster or other content provider. Such parameters may be included with the content as metadata (e.g., tagged by a variety of parties) that can be read and interpreted by various computing devices. Among the parameters that can be defined are the content to which the parameters apply, the versions to which the parameters apply, the encoding scheme, the identification or authentication level or levels required for access to the content (e.g., in-area, out-of-area, level 1, level 2, level 3), the timing requirements for access to the content, the use requirements for access to the content, the ability to access the content linearly, the ability to access the content near linearly, the ability to access the content on-demand, and/or the like. For example, Table 1 below provides exemplary distribution parameters for illustrative content (the current episode of American Idol and all episodes of Lost).

TABLE 1

| CONTENT | VERSION | DISTRIBUTION PARAMETERS |
|---|---|---|
| American Idol | Current Episode | Encode = YES<br>Level(s) = In-Area: Level 1 OR<br>Out-of-Area: Level 1<br>Linear = YES<br>Near Linear = YES If within 59<br>Minutes of Start Time<br>On Demand = NO |
| Lost Reruns | All Episodes | Encode = YES<br>Level(s) = In-Area: Level 1 AND<br>Viewed Content for 5 of Last 30 days<br>Linear = YES<br>Near Linear = NO<br>On Demand = YES |

To access such content, the local device 105 may generate a request for the desired content (Block 735 of FIG. 7). To do so, a user (e.g., operating a local device 105) may initiate a search for content via an appropriate interface by entering search terms. Similarly, a user (e.g., operating a local device 105) may select content from program information, such as the program guide or program listing shown in FIG. 19. For example, a user can (e.g., operating a local device 105) select or click on text, a graphic, or a hyperlink in the program information/data to access the corresponding content. Such an action may generate a request for the content. In one embodiment, the request for content may comprise information/data that can be used to uniquely determine/identify the user and/or local device 105. For instance, the request for content may include the unique broadcast identifier. In another embodiment, the request for content may include user information/data. In one embodiment, the local device 105 transmits the request for content to the authentication server 115.

In one embodiment, the request for content is received via the authentication server 115 (Block 1025 of FIG. 10). In response to (e.g., after) receiving the request for content, the authentication server 115 may determine whether the unique broadcast identifier is valid (Block 1030 of FIG. 10), e.g., whether the user (e.g., local device 105) has been authenticated. This may be executed in a variety of ways including by (a) determining whether the unique broadcast identifier has expired, (b) identifying the authentication status associated with the corresponding user account, and/or (c) the like. The authentication server 115 can also determine whether the requested content is content for which the user has access rights based on, for example, the user's location (e.g., electronic device's location) and whether the request is in compliance with the distribution parameters.

In response to (e.g., after) a determination that the unique broadcast identifier is valid and the request is in compliance with the distribution parameters, the authentication server 115 can allow transmission (e.g., distribution) of the content to the local device 105 (Block 1040 of FIG. 10). However, in response to (e.g., after) a determination that the unique broadcast identifier is not valid or the request is not in compliance with the distribution parameters, the authentication server 115 may not allow transmission (e.g., distribution) of the content to the local device 105 (Block 1035 of FIG. 10).

As previously described, the content can be transmitted (e.g., distributed) to the local device 105 in a variety of ways. For example, in one embodiment, the authentication server 115 can be used to transmit the content (it has tagged and is storing) to the local device 105 via the Internet (or other network). In another embodiment, the authentication server 115 can transmit a notification to the broadcaster (e.g., content server 125 or broadcast server) to provide the specified content to the local device 105 via the Internet (or other network), bypassing the authentication server 115 for distribution of the content. As indicated in Block 740 of FIG. 7, the local device 105 can receive the requested content and display, play, or otherwise provide the same via the local device 105.

In one embodiment, the local device 105 may access content (e.g., via a user operating the local device 105) that is currently being broadcast (e.g., via an OTA broadcast, a DBS broadcast, and/or a cable broadcast). For example, the local device may access (e.g., via a user operating the local device 105) the television show Lost 35 minutes after the Lost broadcast begins. In this example, the authentication server 115 and/or broadcast system 100 may allow the local device 105 to receive the content (e.g., the television show Lost) via a network such as the Internet (a) that is currently being broadcast or (b) from the beginning of the show Lost. As will be recognized, a variety of other approaches and techniques may also be used.

5. Content Access for Remote Device

As indicated, the term remote device may refer to, for example, an electronic device located outside a specific broadcast area when attempting to access content associated with the broadcast area (e.g., an electronic device located outside a broadcaster's broadcast area when attempting to access the broadcaster's content). For ease in understanding various embodiments of the present invention, this approach for broadcast area identification and authentication may be referred to generically as "out-of-area: level 1." Although, in certain embodiments, the remote device 120 may also be located within a broadcaster's broadcast area when attempting to access the broadcaster's content. For example, a remote device 120 may be a user's mobile phone, laptop, or television that, at various times, may be within or outside a specific broadcast area.

In one embodiment, after the local device 105 has been authenticated as being within or proximate a broadcast area, the remote device 120 may be able access the broadcaster's content via the Internet, for example, when outside the broadcast area (e.g., DMA, zip code, block group, census tract, and government-established area/zone) in compliance with the distribution parameters. To do so, the remote device 120 can first be registered with the local device 105 (Blocks 745, 800 of FIGS. 7 and 8). In one embodiment, registration may include inputting (e.g., via a user operating an electronic device) information/data associated with the remote device 120 into the local device 105 via a module, program, browser, or application that was downloaded/preinstalled. In another embodiment, registration may include inputting (e.g., via a user operating an electronic device) information/data associated with the remote device 120 via a webpage of an independent third party. The information/data associated with the remote device 120 may include information/data that uniquely identifies the remote device 120, such as a MAC address or other device identifier. Such information/data may be stored, for example, by the authentication server 115 in association with a user's account or by a corresponding local device 105.

Figure 8:
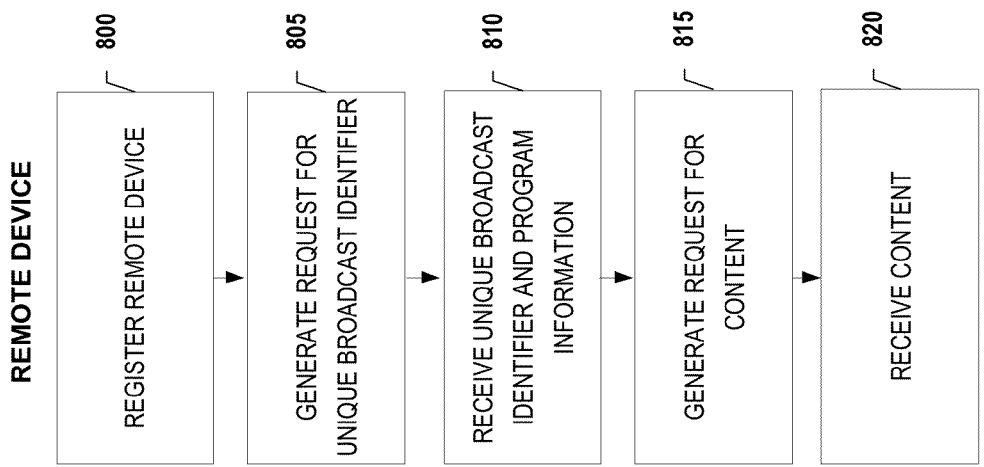

In one embodiment, after the remote device 120 has been registered, the remote device 120 may generate and transmit a request for the unique broadcast identifier to the local device 105 (Block 805 of FIG. 8). The local device 105 can receive the request from the remote device 120, and, in turn, transmit the unique broadcast identifier to the remote device 120 (Blocks 750, 755 of FIG. 7). As indicated in Block 810 of FIG. 8, the remote device 120 can receive the unique broadcast identifier transmitted from the local device 105 (and program information/data as described above). As will be recognized, these functions may be executed, for example, via a browser or downloaded or preinstalled modules, programs, or applications on the local and remote devices 105, 120.

In one embodiment, after receiving the unique broadcast identifier, to access such content, the remote device 120 may generate a request for the desired content (Block 815 of FIG. 8). To do so, a user (e.g., operating a remote device 120) may select content from program information, such as the program guide or program listing shown in FIG. 19. For instance, a user can (e.g., operating a remote device 120) select or click on text, a graphic, or a hyperlink in the program information/data to access the corresponding content. Such an action may generate a request for the content. Generally, the request for content may comprise information/data that can be used to uniquely identify the user, local device 105, and/or remote device 120. For example, in one embodiment, the request for content includes the unique broadcast identifier. The request for content can be transmitted to and received by the authentication server 115 (Block 1025 of FIG. 10). In response to (e.g., after) receiving the request for content, the authentication server 115 may determine whether the unique broadcast identifier is valid (Block 1030 of FIG. 10), e.g., whether the user (e.g., local device 105) has been authenticated. This may be executed in a variety of ways including by (a) determining whether the unique broadcast identifier has expired, (b) identifying the authentication status associated with the corresponding user account, and/or (c) the like. The authentication server 115 can also determine whether the requested content is content for which the user has access rights based on, for example, the user's location (e.g., electronic device's location) and distribution parameters. Table 2 below provides exemplary distribution parameters the television show Lost.

TABLE 2

| CONTENT | VERSION | DISTRIBUTION PARAMETERS |
|---|---|---|
| Lost Reruns | All Episodes | Encode = YES |
| | | Level(s) = In-Area: Level 1 OR |
| | | Out-of-Area: Level 1 |
| | | Linear = YES |
| | | Near Linear = NO |
| | | On Demand = YES |

In response to (e.g., after) a determination that the unique broadcast identifier is valid and that the request is in compliance with the distribution parameters, the authentication server 115 can allow transmission (e.g., distribution) of the content to the local device 105 (Block 1040 of FIG. 10). However, in response to (e.g., after) a determination that the unique broadcast identifier is not valid or the request is not in compliance with the distribution parameters, the authentication server 115 may not allow transmission (e.g., distribution) of the content to the local device 105 (Block 1035 of FIG. 10).

The content can be transmitted (e.g., distributed) to the remote device 120 in a variety of ways. For example, in one embodiment, the authentication server 115 can be used to transmit the content (it has tagged and is storing) to the remote device 120 via the Internet (or other network). In another embodiment, the authentication server 115 can transmit a notification to the broadcaster (e.g., content server 125 or broadcast server) to provide the specified content to the remote device 120 via the Internet (or other network), bypassing the authentication server 115 for distribution of the content. As indicated in Block 820 of FIG. 8, the remote device 120 can receive the requested content and display, play, or otherwise provide the same via the remote device 120.

In various embodiments, because the local device 105 has been authenticated as having a presence within or proximate the broadcaster's broadcast area, the user's registered remote devices 120 can be used to access content from the broadcaster when outside the broadcast area (e.g., DMA, zip code, block group, census tract, and government-established area/zone). For example, a user may take her mobile phone or laptop on a business trip or vacation outside the broadcaster's broadcast area. In such a case, the described authentication can allow the user (or other parties) to access content (e.g., stream a newscast or television program) from the broadcaster even when outside the broadcaster's broadcast area. This may allow the user to access a broadcaster's content regardless of location and/or device.

In one embodiment, the user may be limited in the number of remote devices 120 that can be registered for access to content. For example, the user may only be able to register five devices with the local device 105. In various embodiments, this may limit fraud attempts by users in registering friends' or relatives' remote devices 120 for access to content outside a specific broadcast area.

IV. Example 2

Broadcast Area Identification and Authentication

Although portions of following describe an implementation using an OTA broadcast system, embodiments of the present invention may use a variety of broadcast systems, including a cable broadcast system, a satellite broadcast system, and/or a variety of other systems for transmitting broadcasts. Thus, the described examples for broadcast area identification/determination are provided for illustrative purposes only and should not be taken in any way as limiting embodiments of the present invention to the examples provided. As indicated, a broadcast area may correspond to one or more DMAs, which can be used to determine/identify the television offerings in the broadcast area. A broadcast area, though, may also correspond to a variety of other types of broadcast areas, such as block groups, zip codes, census tracts, government-established areas/zones, cartographic levels, and/or the like.

1. User Registration

Figure 11:
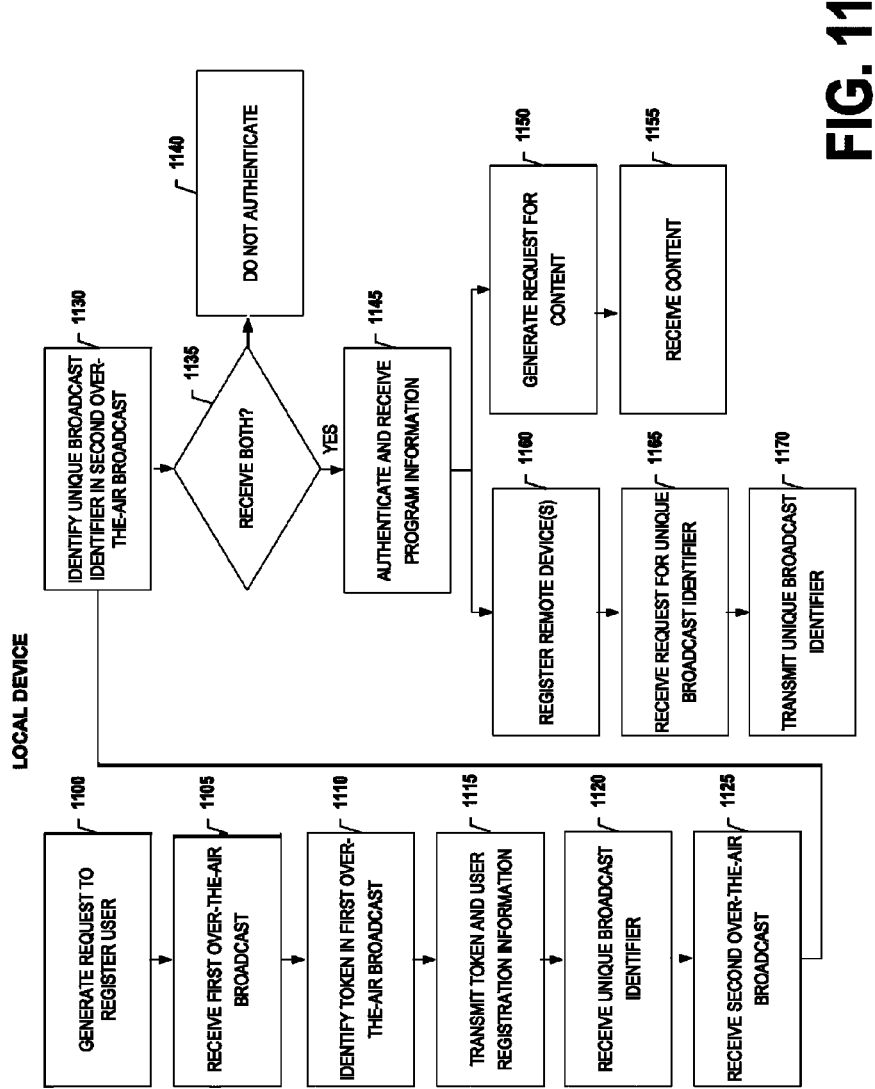
Figure 14:
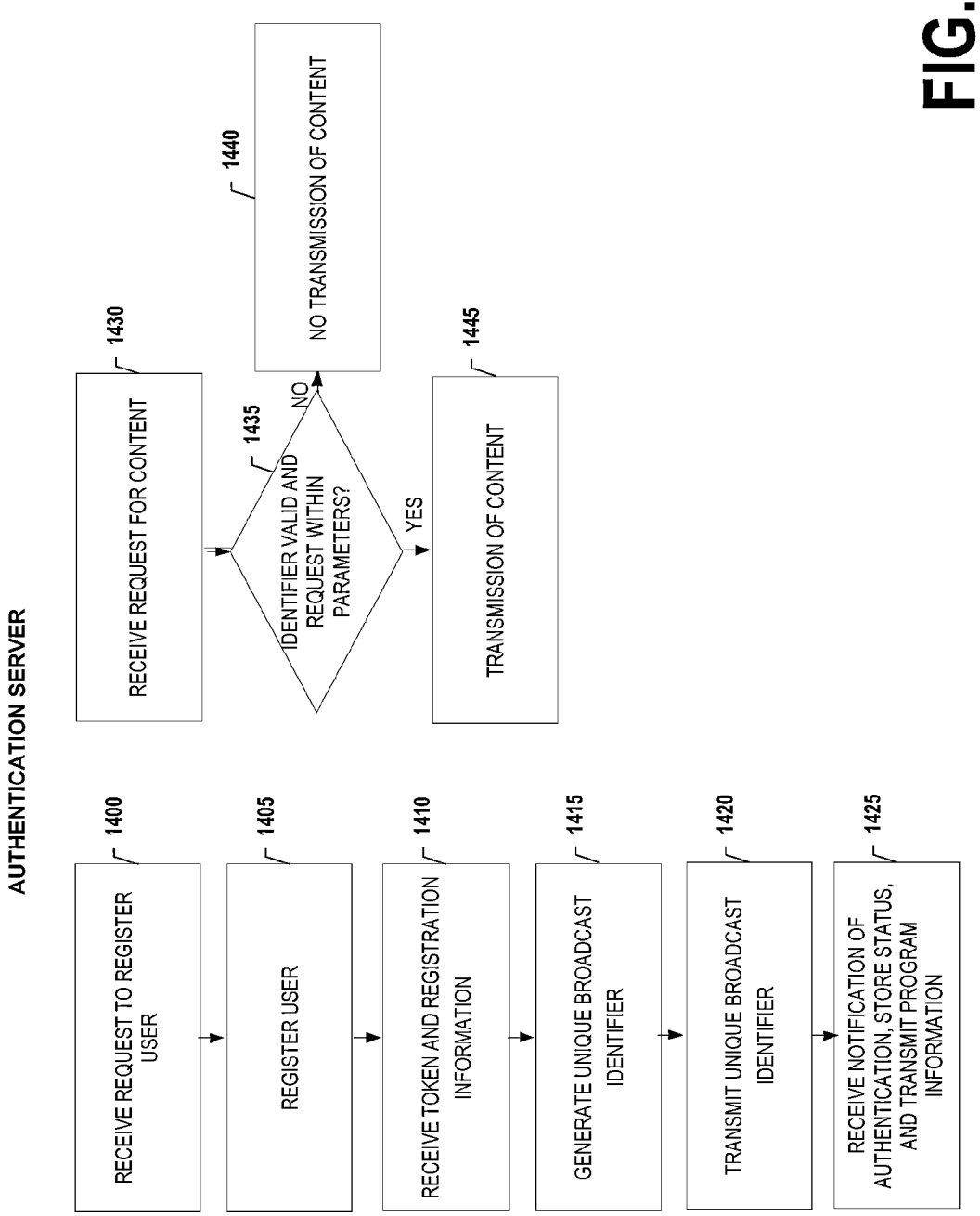

In one embodiment, as shown in FIGS. 11 and 14, the process begins by a local device 105 (e.g., via a user operating a local device 105) generating a request to register a user to access a broadcaster's content via a network such as the Internet (Block 1100 of FIG. 11). The request may be a request, for example, to register the user directly with a specific broadcaster (e.g., KCRG-TV9) or an independent third party representing multiple broadcasters (e.g., www.syncbak.com). In one embodiment, the request to register the user may be executed via a module, program, browser, or application that has been downloaded or preinstalled on the local device 105. In another embodiment, the request to register the user may be generated via a webpage of a broadcaster or an independent third party.

In one embodiment, the request to register the user may include user information/data. The user information/data may include a variety of information/data associated with the user and/or the local device 105. For example, the user information/data may include (a) the user's first and last name, (b) the user's address, (c) the user's zip code, (d) the user's telephone number, (e) a username, (f) a charge card number, (g) a local device identifier (e.g., SIM number, MAC address, IMSI number, IP address, MEID), and/or (h) the like. The user information/data may be used to uniquely determine/identify the user and/or the local device 105.

As shown in FIG. 14, in one embodiment, the request to register the user is sent to and received by an authentication server 115 (Block 1400 of FIG. 14). As previously discussed, the physical location and operation of the authentication server 115 may vary. For example, the authentication server 115 may be operated by (a) a broadcaster or (b) an independent third party. Irrespective of ownership and/or operation, in response to receiving the request to register the user, the authentication server 115 can create a user account with the user information/data and electronically store at least a portion of the user information/data in association with the user account (Block 1405 of FIG. 14).

It should be noted that in various embodiments, the user account may be used to not only store information/data associated with the user and the local device 105, but information/data associated with additional local devices 105 (e.g., a personal computer and a television in the user's home) and/or remote devices 120 (e.g., an electronic device located outside a broadcaster's broadcast area when attempting to access the broadcaster's content, such as a mobile phone or laptop). The user account and/or user information/data may be used to provide content to the local device 105 and/or remote device 120 via the Internet (or other network). In one embodiment, to provide content from the broadcaster to the local device 105 and/or remote device 120 via the Internet, for example, the local device 105 can be authenticated as being within or proximate the broadcaster's broadcast area.

As will be recognized, a variety of techniques and approaches can be used to adapt to various needs and circumstances. For example, certain embodiments contemplate registration-free implementations. Similarly, other embodiments contemplate silent or background registrations.

2. Token Generation and Token Broadcast

Figure 13:
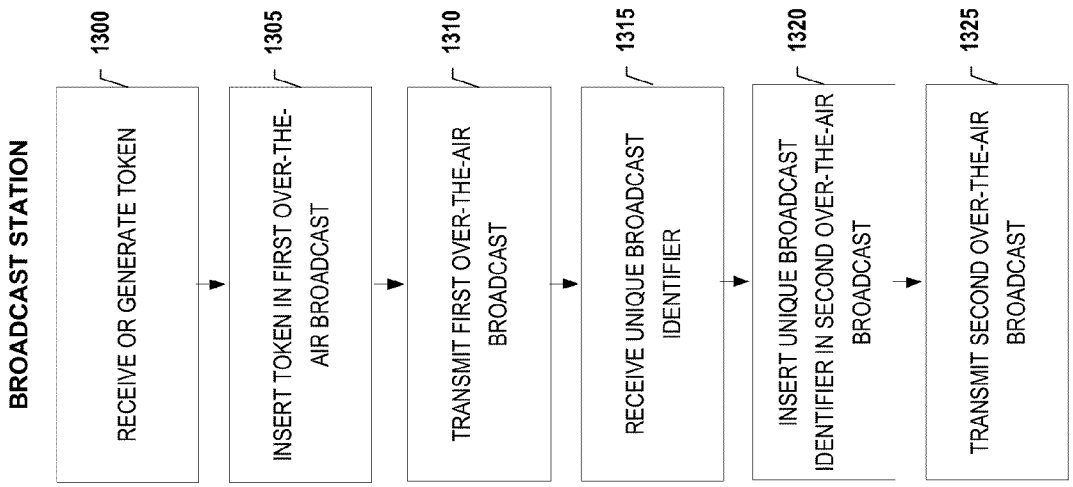

In one embodiment, as shown in FIG. 13, the identification and authentication process may begin with the broadcast system 100. As indicated in Block 1300 of FIG. 13, the broadcast system 100 can generate a token for insertion into an OTA broadcast, which may be referred to as a first OTA broadcast. In another embodiment, instead of generating the token, the broadcast system 100 can receive the token from a computing entity such as the authentication server 115. The token may comprise data or other information/data that uniquely identifies the broadcast system 100, the broadcaster, the broadcaster's broadcast area, a television channel associated with the broadcaster, and/or the like. In one embodiment, the token may be a unique alphanumeric identifier that identifies the broadcast system 100 broadcasting/transmitting the first OTA broadcast. Continuing with the above example, the token may be a unique alphanumeric identifier that identifies KCRG-TV9 in Cedar Rapids, Iowa.

As indicated in Block 1305 of FIG. 13, after the token is generated, the broadcast system 100 can insert the token into the first OTA broadcast. In one embodiment, the broadcast system 100 may insert the token into the first OTA broadcast using the PSIP delivery schema or any of a variety of other approaches and techniques. For example, the broadcast system 100 may insert the token into the first OTA broadcast as an ancillary data stream.

In one embodiment, after inserting the token into the first OTA broadcast, the broadcast system 100 broadcasts/transmits the first OTA broadcast comprising the token (Block 1310 of FIG. 13). The first OTA broadcast can be broadcast/transmitted in the broadcaster's broadcast area (e.g., DMA, zip code, block group, census tract, and government-established area/zone) as a one-to-many broadcast. As will be recognized, the first OTA broadcast may be relayed, repeated, or otherwise transmitted via multiple broadcast systems 100 or devices within the broadcast area (e.g., DMA, zip code, block group, census tract, and government-established area/zone). Thus, the first OTA broadcast can be received by any local devices 105 within or proximate the broadcaster's broadcast area (e.g., DMA, zip code, block group, census tract, and government-established area/zone).

3. Token Reception and Token Identification

In various embodiments, an attenuated OTA broadcast (e.g., an attenuated signal) may still be received and used to identify the token therein because the signal carrying the OTA broadcast need only be sufficient to allow identification of the token. In other words, as the OTA broadcast (e.g., OTA signal) reaches the local device 105, the OTA broadcast need only be sufficient for the local device 105 to recover the data, not the content (e.g., audio and/or video). This approach may allow for local devices 105 that were considered out of range to recover the content of an OTA broadcast to receive the OTA broadcast and identify the token therein.

In one embodiment, as shown in FIG. 6, a local device 105 may receive OTA broadcasts from any number of broadcast systems 100. For instance, a local device 105 located in Cedar Rapids, Iowa may simultaneously receive 12-15 OTA broadcasts. In one embodiment, each OTA broadcast may comprise a token that identifies its associated broadcast system 100, broadcaster, broadcaster's broadcast area, television channel, and/or the like. Thus, at any time, the local device 105 may receive many OTA broadcasts from various broadcast systems 100 and identify the tokens respectively broadcast/transmitted therein.

In one embodiment, as a result of the broadcast system 100 broadcasting/transmitting the first OTA broadcast, the local device 105 receives the first OTA broadcast (Block 1105 of FIG. 11). In part, this is possible because the local device 105 is located within or proximate the broadcaster's broadcast area. As the local device receives OTA broadcasts, the local device 105 scans for and identifies (e.g., via a downloaded or preinstalled module, program, or application) tokens in the OTA broadcasts it receives (Block 1110 of FIG. 11). Continuing with the above example, the local device 105 scans for and identifies the token in the first OTA broadcast identifying KCRG-TV9 in Cedar Rapids, Iowa. In one embodiment, this can be used to determine/identify the appropriate broadcast area (e.g., DMA, zip code, block group, census tract, and government-established area/zone) for the local device 105 based on its location.

In various embodiments, receipt of the first OTA broadcast and identification of the token may not be accessible to the user of the local device 105. By limiting access to the token, the broadcaster can limit erroneous authentications of local devices 105. As will be recognized, a variety of techniques and approaches may be used to limit user access to this part of the process.

In one embodiment, after identifying the token in the first OTA broadcast, the local device 105 transmits the token and at least a portion of the user information/data to the authentication server 115 via a network such as the Internet (Block 1115 of FIG. 11). As indicated, the user information/data may include (a) the user's first and last name, (b) the user's address, (c) the user's zip code, (d) the user's telephone number, (e) a username (f) a charge card number, (g) a local device identifier, e.g., MAC address or IP address, and/or (h) the like. The token and user information/data can then be used by the authentication server 115 as part of the process in authenticating the local device 105.

4. Unique Broadcast Identifier Generation

As indicated in Block 1410 of FIG. 14, in one embodiment, the authentication server 115 is transmitted and receives the token and the user information/data from the local device 105. The authentication server 115 can then generate a unique broadcast identifier based at least in part, for example, on the token and the user information/data it receives from the local device 105 (Block 1415 of FIG. 14).

As described, the token can be used to uniquely determine/identify the broadcast system 100, the broadcaster, the broadcaster's broadcast area, a television channel associated with the broadcaster, and/or the like. Similarly, the user information/data can be used to uniquely determine/identify the user and/or the corresponding local device 105. Thus, in one embodiment, the unique broadcast identifier generated by the authentication server 115 can be used to uniquely determine/identify the user, the local device 105, and/or the content (e.g., channels or broadcasters) for which the local device 105 is being or has been authenticated. For example, the unique broadcast identifier may comprise 12 characters. As shown in FIGS. 17A and 17B, the first nine characters of the unique broadcast identifier may comprise a user/local device portion. The user/local device portion may be used to uniquely determine/identify the user and/or the local device 105. For instance, 974.468.210 may be the first nine characters of the unique broadcast identifier that uniquely determine/identify the user and/or the local device 105. The last three characters of the unique broadcast identifier may comprise a content portion. The content portion of the unique broadcast identifier may be used to identify the content (e.g., channels or broadcasters) for which the local device 105 is being or has been authenticated. For example, 001 may be the last 3 characters used in the unique broadcast identifier to determine/identify the content (e.g., channels or broadcasters). Thus, continuing with the above example, 001 may be used to represent KCRG-TV9 in Cedar Rapids, Iowa. Accordingly, if the local device 105 is authenticated with a unique broadcast identifier of 974.468.210.001, the unique broadcast identifier may be used to indicate that the user and/or local device 105 has access rights to KCRG-TV9's content via the Internet (or other network).

Additionally, given that each broadcaster in the United States may have 19.4 megabits per second of spectrum available for broadcast, the broadcaster may be able to simultaneously provide (a) content that is free for user consumption and (b) premium content for which the user pays a fee (e.g., a micro-transaction fee) to access. In one embodiment, the unique broadcast identifier may be used as a key, for example, to access any premium content for which the user has paid.

In one embodiment, after generating the unique broadcast identifier, the authentication server 115 transmits the unique broadcast identifier to both the broadcast system 100 and the local device 105 (Block 1420 of FIG. 14). As indicated in Block 1120 of FIG. 11, the local device 105 receives the unique broadcast identifier from the authentication server 115 and stores it, for example, in memory. Similarly, as indicated in Block 1315 of FIG. 13, the broadcast system 100 receives the unique broadcast identifier from the authentication server 115 for broadcast/transmission via a second OTA broadcast.

5. Broadcast Area Identification and Authentication

As indicated, the (a) local device 105 can receive the unique broadcast identifier from the authentication server 115 and (b) broadcast system 100 can receive the unique broadcast identifier from the authentication server 115. In one embodiment, the broadcast system 100 can then insert the unique broadcast identifier into a second OTA broadcast (Block 1320 of FIG. 13). This may be executed, for example, using the PSIP delivery schema or any of a variety of other approaches and techniques. Thus, as previously described with regard to the first OTA broadcast, the broadcast system 100 can insert the unique broadcast identifier into the second OTA broadcast as an ancillary data stream. After inserting the unique broadcast identifier into the second OTA broadcast, the broadcast system 100 broadcasts/transmits the second OTA broadcast (Block 1325 of FIG. 13). Similar to the first OTA broadcast, the broadcast system 100 broadcasts/transmits the second OTA broadcast as a one-to-many broadcast. As will be recognized, the second OTA broadcast may be relayed, repeated, or otherwise transmitted via multiple broadcast systems 100 or devices within the broadcast area (e.g., DMA, zip code, block group, census tract, and government-established area/zone). Thus, the second OTA broadcast can be received by any number of local devices 105 within the broadcast area (e.g., DMA, zip code, block group, census tract, and government-established area/zone).

In one embodiment, as a result of the broadcast system 100 broadcasting/transmitting the second OTA broadcast in the broadcast area (e.g., DMA, zip code, block group, census tract, and government-established area/zone), the local device 105 can receive the second OTA broadcast (Block 1125 of FIG. 11). As the local device 105 receives the second OTA broadcast, the local device 105 scans for and identifies any unique broadcast identifiers corresponding to the user and/or the local device 105 (Block 1130 of FIG. 11). For example, using the user information/data associated with the local device 105 as a key, for example, the downloaded/preinstalled module, program, or application can be used to identify (e.g., translate) any unique broadcast identifiers that correspond to the user or local device 105.

In one embodiment, after identifying the unique broadcast identifier corresponding to the user or local device 105 in the second OTA broadcast, the local device 105 can proceed with authentication. In one embodiment, to be authenticated, the local device 105 needs to receive the unique broadcast identifier (a) from the authentication server 115 and (b) via the second OTA broadcast from the broadcast system 100 (Block 1135 of FIG. 11). Practically, the local device 105 can receive the unique broadcast identifier from the authentication server 115 and temporarily stores it in memory. The local device 105 can also scan for and identify the unique broadcast identifier corresponding to user or local device 105 in the second OTA broadcast. In response to (a) receiving the unique broadcast identifier from both the authentication server 115 and the broadcast system 100 and (b) confirming/determining that the unique broadcast identifiers are the substantially same (e.g., if the condition is equal), the local device 105 can be authenticated (Block 1145 of FIG. 11). If, however, the local device 105 does not receive the same unique broadcast identifier from the authentication server 115 and the broadcast system 100 via the second OTA broadcast (e.g., if the condition is not equal), the local device 105 may not be authenticated (Block 1140).

In one embodiment, as part of the local device 105 being authenticated, the local device 105 stores the unique broadcast identifier for use in accessing content from the broadcaster via the Internet (or other network). Moreover, the local device 105 (e.g., via a downloaded or preinstalled module, program, or application) can generate and transmit a notification to the authentication server 115 regarding the local device's 105 authentication status. The authentication status may indicate whether and for which channels the user and/or local device 105 have been authenticated. In response to receiving the notification from the local device 105, the authentication server 115 can store the local device's 105 authentication status in association the user account corresponding to the user and/or the local device 105 (Block 1425 of FIG. 14). For ease in understanding various embodiments of the present invention, this approach for broadcast area identification and authentication may be referred to generically as "in-area: level 2." As will be recognized, at any given time, the authentication server 115 may store or have access to the authentication statuses of any number of local devices 105.

In one embodiment, as a further measure of protection, the broadcaster may require the local device 105 to re-authenticate at predetermined times to receive continued access to its content via the Internet (or other network). For example, the broadcaster may require the local device 105 to be re-authenticated periodically, such as every 30 minutes, once a day, or once a week. In this embodiment, the unique broadcast identifier may automatically expire after a predetermined period of time. In another embodiment, the broadcaster may require continuous re-authentication of the local device 105.

As will be recognized, when authenticating multiple local devices 105, the authentication server 115 can generate a unique broadcast identifier for each local device 105 being authenticated. Thus, at any given time, the broadcast system 100 may broadcast/transmit a burst with numerous unique broadcast identifiers, each uniquely identifying an associated local device 105 and corresponding content access rights. Similarly, a local device 105 may receive numerous unique broadcast identifiers, but only identify (e.g., be able to translate) the unique broadcast identifiers to which it corresponds. As will be recognized, a single OTA broadcast may include a token(s) and any number of unique broadcast identifiers.

The preceding describes processes for identifying a broadcast area (e.g., DMA, zip code, block group, census tract, and government-established area/zone) and authenticating a local device 105 as being within the broadcast area (e.g., DMA, zip code, block group, census tract, and government-established area/zone). In various embodiments, this may allow a broadcaster to confirm that the local device 105 is within or proximate the broadcaster's broadcast area. Thus, after the local device 105 has been authenticated, the broadcaster can provide content to the local device 105 via a network such as the Internet while complying with various distribution parameters. This also allows the local device 105 (or other computing entity) to determine what channels (or other offerings) it can receive.

In embodiment, after identifying the appropriate broadcast area (e.g., DMA, zip code, block group, census tract, and government-established area/zone) for an electronic device (e.g., local device 105 or remote device 120) and/or being authenticated, the authentication server 115 can provide program information/data for the broadcast area in which the local device 105 is located. As shown in FIGS. 18 and 19, the program information/data may include program guides and/or program listings of live content (including linear content) and/or on-demand content, for example, which are available for consumption via the local device 105 and/or remote device 120. For instance, as seen in these figures, this exemplary program information/data includes content available during the 8:00 pm and/or 9:00 pm hours on ABC, CBS, FOX, NBC, PBS, The CW, and ION.

Operatively, to receive such program information, the local device 105 can request program information/data from various computing entities, including the authentication server 115, a broadcast server, or a search engine. As will be recognized, an electronic device (e.g., local device 105 or remote device 120) can refresh such program information/data on a periodic, regular, and/or continuous basis through a variety of other approaches and techniques.

6. Content Access for Local Device

In one embodiment, after the appropriate broadcast area (e.g., DMA, zip code, block group, census tract, and government-established area/zone) has been identified and the local device 105 has been authenticated as being associated with the broadcast area (e.g., DMA, zip code, block group, census tract, and government-established area/zone), the local device 105 can access content (e.g., via a user operating the local device 105) via the Internet, for example. As discussed, the content may include television broadcasts, television programs, movies, datacasts, music, images, videos, text, webpages, and/or the like. In one embodiment, the content may be stored and distributed via one or more content servers 125 and/or one or more broadcast servers in response (e.g., after) to an appropriate notification from the authentication server 115. In such an embodiment, the authentication server 115 may store one or more distribution parameters for distributing the different content and evaluating requests for content for compliance with the distribution parameters. In another embodiment, the authentication server 115 may receive content for distribution from one or more content servers 125 and/or one or more broadcast servers. In such an embodiment, the authentication server 115 may store the distribution parameters and/or tag (e.g., include metadata) the different content with the corresponding distribution parameters. Then, the authentication server 115 can evaluate requests for content for compliance with the distribution parameters and distribute the content accordingly.

As previously described, distribution parameters can be defined by various parties, including the broadcaster or other content provider. Such parameters may be included with the content as metadata (e.g., tagged by a variety of parties) that can be read and interpreted by various computing devices. Among the parameters that can be defined are the content to which the parameters apply, the versions to which the parameters apply, the encoding scheme, the identification or authentication level or levels required for access to the content (e.g., in-area, out-of-area, level 1, level 2, level 3), the timing requirements for access to the content, the use requirements for access to the content, the ability to access the content linearly, the ability to access the content near linearly, the ability to access the content on-demand, and/or the like. For example, Table 3 below provides exemplary distribution parameters for illustrative content (Episode 1127 of the Jerry Springer Show and all episodes of Lost).

TABLE 3

| CONTENT | VERSION | DISTRIBUTION PARAMETERS |
|---|---|---|
| Jerry Springer Show | Episode 1127 | Encode = YES<br>Level(s) = In-Area: Level 1 OR<br>In-Area: Level 2<br>Linear = YES<br>Near Linear = NO<br>On Demand = YES If within 2 Hours of Original Airing |
| Lost Reruns | All Episodes | Encode = YES<br>Level(s) = In-Area: Level 2 OR<br>Out-of-Area: Level 2<br>Linear = YES<br>Near Linear = YES If within 59 Minutes of Start Time<br>On Demand = NO |

In one embodiment, to access such content, the local device 105 may generate a request for the desired content (Block 1150 of FIG. 11). To do so, a user (e.g., operating a local device 105) may initiate a search for content via an appropriate interface by entering search terms. Similarly, a user (e.g., operating a local device 105) may select content from program information, such as the program guide or program listing shown in FIG. 19. For example, a user can (e.g., operating a local device 105) select or click on text, a graphic, or a hyperlink in the program information/data to access the corresponding content. Such an action may generate a request for the content. In one embodiment, the request for content may comprise information/data that can be used to uniquely determine/identify the user and/or local device 105. For example, in one embodiment, the request for content may include the unique broadcast identifier. In another embodiment, the request for content may include user information/data. In one embodiment, the local device 105 transmits the request for content to the authentication server 115.

In one embodiment, the request for content is received via the authentication server 115 (Block 1430 of FIG. 14). In response to receiving the request for content, the authentication server 115 determines whether the unique broadcast identifier is valid (Block 1435 of FIG. 14), e.g., whether the user (e.g., local device 105) has been authenticated. This may be executed in a variety of ways including by (a) determining whether the unique broadcast identifier has expired, (b) identifying the authentication status associated with the corresponding user account, and/or (c) the like. The authentication server 115 can also determine whether the requested content is content for which the user has access rights based on, for example, the user's location (e.g., electronic device's location) and whether the request is in compliance with the distribution parameters.

In one embodiment, in response to a determination that the unique broadcast identifier is valid and that the request for content is in compliance with the distribution parameters, the authentication server 115 can allow transmission (e.g., distribution) of the content to the local device 105 (Block 1445 of FIG. 14). However, in response to a determination that the unique broadcast identifier is not valid or that the request for content is not in compliance with the distribution parameters, the authentication server 115 may not allow transmission (e.g., distribution) of the content to the local device 105 (Block 1440 of FIG. 14).

As previously described, the content can be transmitted (e.g., distributed) to the local device 105 in a variety of ways. For example, in one embodiment, the authentication server 115 can be used to transmit the content (it has tagged and is storing) to the local device 105 via the Internet (or other network). In another embodiment, the authentication server 115 can transmit a notification to the broadcaster (e.g., content server 125 or broadcast server) to provide the specified content to the local device 105 via the Internet (or other network), bypassing the authentication server 115 for distribution of the content. As indicated in Block 1155 of FIG. 11, the local device 105 can receive the requested content and display, play, or otherwise provide the same via the local device 105.

In one embodiment, the local device 105 may access content (e.g., via a user operating the local device 105) that is currently being broadcast OTA. For example, the local device may access (e.g., via a user operating the local device 105) the television show Lost 35 minutes after the Lost OTA broadcast begins. In this example, the authentication server 115 and/or broadcast system 100 may allow the local device 105 to receive the content (e.g., the television show Lost) via a network such as the Internet (a) that is currently being broadcast OTA or (b) from the beginning of the show Lost. As will be recognized, a variety of other approaches and techniques may also be used.

7. Content Access for Remote Device

As indicated, the term remote device may refer to, for example, an electronic device located outside a specific broadcast area when attempting to access content associated with the broadcast area (e.g., an electronic device located outside a broadcaster's broadcast area when attempting to access the broadcaster's content). For ease in understanding various embodiments of the present invention, this approach for broadcast area identification and authentication may be referred to generically as "out-of-area: level 2." In one embodiment, after the local device 105 has been authenticated as being within or proximate a broadcast area, the remote device 120 may be able access the broadcaster's content via the Internet, for example, when outside the broadcast area (e.g., DMA, zip code, block group, census tract, and government-established area/zone). To do so, the remote device 120 can first be registered with the local device 105 (Blocks 1160, 1200 of FIGS. 11 and 12). In one embodiment, registration may include inputting (e.g., via a user operating an electronic device) information/data associated with the remote device 120 into the local device 105 via a module, program, browser, or application that was downloaded/pre-installed. In another embodiment, registration may include inputting (e.g., via a user operating an electronic device) information/data associated with the remote device 120 via a webpage of an independent third party. The information/data associated with the remote device 120 may include information/data that uniquely identifies the remote device 120, such as a MAC address or other device identifier.

Figure 12:
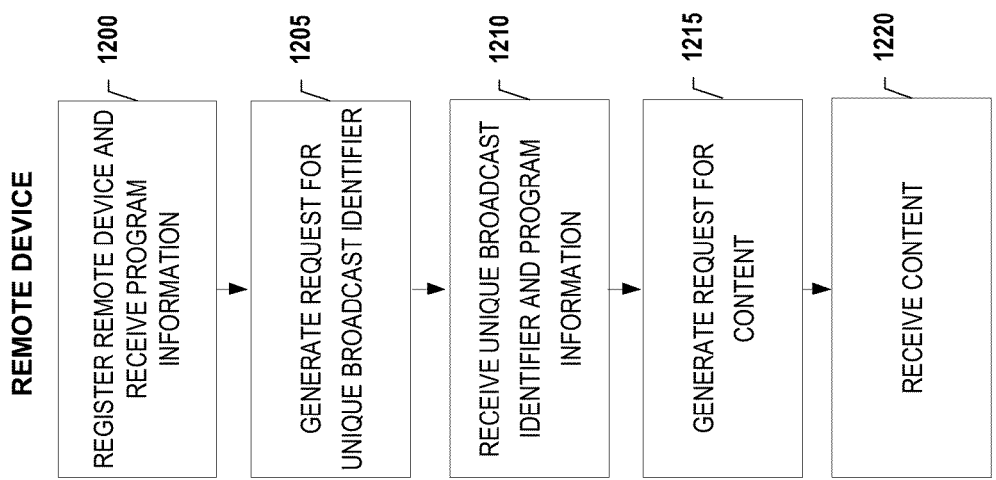

In one embodiment, after the remote device 120 has been registered, the remote device 120 may generate and transmit a request for the unique broadcast identifier to the local device 105 (Block 1205 of FIG. 12). The local device 105 can receive the request from the remote device 120, and, in turn, transmit the unique broadcast identifier to the remote device 120 (Blocks 1165, 1170 of FIG. 11). As indicated in Block 1210 of FIG. 12, the remote device 120 can receive the unique broadcast identifier transmitted from the local device 105 (and program information/data as previously described). As will be recognized, these functions may be executed, for example, via a browser or downloaded or preinstalled modules, programs, or applications on the local and remote devices 105, 120.

In one embodiment, after receiving the unique broadcast identifier, to access such content, the remote device 120 may generate a request for the desired content (Block 1215 of FIG. 12). To do so, a user (e.g., operating a remote device 120) may select content from program information, such as the program guide or program listing shown in FIG. 19. For instance, a user can (e.g., operating a remote device 120) select or click on text, a graphic, or a hyperlink in the program information/data to access the corresponding content. Such an action may generate a request for the content. Generally, the request for content may comprise information/data that can be used to uniquely determine/identify the user, local device 105, and/or remote device 120. For example, in one embodiment, the request for content includes the unique broadcast identifier. The request for content can be transmitted to and received by the authentication server 115 (Block 1430 of FIG. 14). In response to receiving the request for content, the authentication server 115 determines whether the unique broadcast identifier is valid (Block 1435 of FIG. 14), e.g., whether the user (e.g., local device 105) has been authenticated. This may be executed in a variety of ways including by (a) determining whether the unique broadcast identifier has expired, (b) identifying the authentication status associated with the corresponding user account, and/or (c) the like. The authentication server 115 can also determine whether the requested content is content for which the user has access rights based on, for example, the user's location (e.g., electronic device's location) and/or distribution parameters. As described previously, Table 4 below provides exemplary distribution parameters.

TABLE 4

| CONTENT | VERSION | DISTRIBUTION PARAMETERS |
|---|---|---|
| Lost Reruns | All Episodes | Encode = YES<br>Level(s) = In-Area: Level 2 OR<br>Out-of-Area: Level 2<br>Linear = YES<br>Near Linear = NO<br>On Demand = YES |

In response to a determination that the unique broadcast identifier is valid and that the request for content is in compliance with the distribution parameters, the authentication server 115 can allow transmission (e.g., distribution) of the content to the remote device 120 (Block 1445 of FIG. 14). However, in response to a determination that the unique broadcast identifier is not valid or that the request for content is not in compliance with the distribution parameters, the authentication server 115 may not allow transmission (e.g., distribution) of the content to the remote device 120 (Block 1440 of FIG. 14).

The content can be transmitted (e.g., distributed) to the remote device 120 in a variety of ways. For example, in one embodiment, the authentication server 115 can be used to transmit the content (it has tagged and is storing) to the remote device 120 via the Internet (or other network). In another embodiment, the authentication server 115 can transmit a notification to the broadcaster (e.g., content server 125 or broadcast server) to provide the specified content to the remote device 120 via the Internet (or other network), bypassing the authentication server 115 for distribution of the content. As indicated in Block 1220 of FIG. 12, the remote device 120 can receive the requested content and display, play, or otherwise provide the same via the remote device 120.

In various embodiments, because the local device 105 has been authenticated as having a presence within or proximate the broadcaster's broadcast area, the user's registered remote devices 120 can be used to access content from the broadcaster when outside the broadcast area (e.g., DMA, zip code, block group, census tract, and government-established area/zone). For example, a user may take her mobile phone or laptop on a business trip or vacation outside the broadcaster's broadcast area. In such a case, the described authentication can allow the user (or other parties) to access content (e.g., stream a newscast or television program) from the broadcaster even when outside the broadcaster's broadcast area. This may allow the user to access a broadcaster's content regardless of location and/or device.

In one embodiment, the user may be limited in the number of remote devices 120 that can be registered for access to content. For example, the user may only be able to register 5 devices with the local device 105. In various embodiments, this may limit fraud attempts by users in registering friends' or relatives' remote devices 120 for access to content outside a specific broadcast area.

V. Example 3

Broadcast Area Identification

The described examples for broadcast area identification/determination are provided for illustrative purposes only and should not be taken in any way as limiting embodiments of the present invention to the examples provided. As indicated, a broadcast area may correspond to one or more DMAs, which can be used to determine/identify the television offerings in the broadcast area. A broadcast area, though, may also correspond to a variety of other types of broadcast areas, such as block groups, zip codes, census tracts, government-established areas/zones, cartographic levels, and/or the like.

1. User Registration

Figure 15:
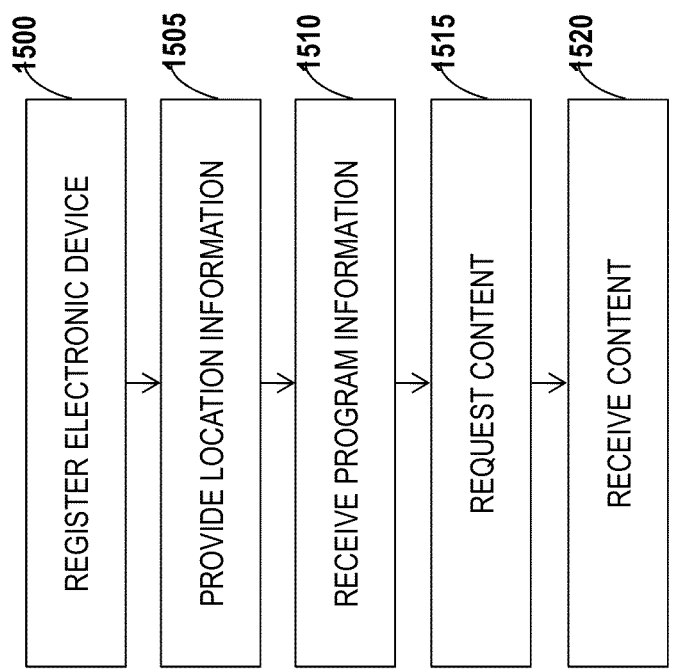

In one embodiment, the process may begin by a local device 105 (e.g., via a user operating a local device 105) generating a request to register a user to access a broadcaster's content via a network such as the Internet (Block 1500 of FIG. 15). The request may be a request, for example, to register the user directly with a specific broadcaster (e.g., KCRG-TV9, Comcast, DISH Network) or an independent third party representing multiple broadcasters (e.g., www.syncbak.com). In one embodiment, the request to register the user may be executed via a module, program, browser, or application that has been downloaded or preinstalled (e.g., is resident) on the local device 105. In another embodiment, the request to register the user may be generated via a webpage of a broadcaster or an independent third party.

In one embodiment, the request to register the user may include user information/data. The user information/data may include a variety of information/data associated with the user and/or the local device 105. For example, the user information/data may include (a) the user's first and last name, (b) the user's address, (c) the user's zip code, (d) the user's telephone number, (e) a username, (f) a charge card number, (g) a local device identifier (e.g., SIM number, MAC address, IMSI number, IP address, MEID), and/or (h) the like. The user information/data may be used to uniquely determine/identify the user and/or the local device 105.

In one embodiment, the request to register the user can be sent to and received by an authentication server 115 (Block 1600 of FIG. 16). As previously discussed, the physical location and operation of the authentication server 115 may vary. For example, the authentication server 115 may be operated by (a) a broadcaster or (b) an independent third party. Irrespective of ownership and/or operation, in response to (e.g., after) receiving the request to register the user, the authentication server 115 can create a user account with the user information/data and electronically store at least a portion of the user information/data in association with the user account.

It should be noted that in various embodiments, the user account may be used to not only store information/data associated with the user and the local device 105, but information/data associated with additional local devices 105 (e.g., a personal computer and a television in the user's home) and/or remote devices 120. The user account and/or user information/data may be used to provide content to the local device 105 and/or remote device 120 via the Internet (or other wired or wireless network). In one embodiment, to provide content from the broadcaster to the local device 105 and/or remote device 120 via the Internet, for example, the local device 105 can be used to determine/identify the broadcast area (e.g., DMA, zip code, block group, census tract, and government-established area/zone) in which the local device 105 is located.

As will be recognized, a variety of techniques and approaches can be used to adapt to various needs and circumstances. For example, certain embodiments contemplate registration-free implementations. Similarly, other embodiments contemplate silent or background registrations.

2. Broadcast Area Determination/Identification

In one embodiment, a local device 105 can be used to determine/identify the broadcast area in which it is located on a periodic basis, regular basis, continuous basis, and/or in response to certain triggers (e.g., searches related to content). To determine/identify the broadcast area in which it is located, the local device 105 can first determine its location (e.g., collect information/data about its location) using a variety of methods. For instance, the local device 105 can determine its location (e.g., collect location information) by determining its position relative to GPS satellites. Similarly, the local device 105 can determine its location (e.g., collect location information) by determining its position relative to cellular towers or Wi-Fi access points (e.g., via triangulation). Or, the local device 105 can determine its location (e.g., collect location information) by extracting such information from an Internet Protocol (IP) address associated with the local device 105. In another embodiment, the local device 105 can collect location information/data via user input. For instance, a user may input the zip code, city and state, zoning information, and/or the like for his/her current location.

In one embodiment, after determining its location (e.g., collecting location information), the local device 105 can provide at least a portion of the location information/data to the authentication server 115 for determination/identification of the broadcast area corresponding to the local device's 105 location (Block 1505 of FIG. 15). In one embodiment, the local device 105 can provide the location information/data via an application or module resident on the local device 105. The location information/data may include zip code information/data, zoning information/data, city information/data, broadcast area information/data, latitude information/data, longitude information/data, altitude information/data, geocode information/data, ephemeris information/data, cellular tower information/data, Wi-Fi access point information/data, IP address information/data, and/or the like.

After receiving the location information/data from the local device 105 (Block 1605 of FIG. 16), the authentication server 115 (e.g., via a location module) can use the location information/data from the local device 105 to determine/identify the broadcast area (e.g., DMA, zip code, block group, census tract, and government-established area/zone) associated with the location information/data (Block 1610 of FIG. 16). To do so, in one embodiment, the authentication server 115 can translate the location information/data into a broadcast area designation by using, for example, a database storing cartographic layers/levels of the various broadcast areas. For example, if a local device 105 provides location information/data that identifies the location of the local device 105 as being in (or proximate) Fayette, Iowa, the authentication server 115 may determine/identify the corresponding broadcast area as broadcast area 637 (i.e., the Cedar Rapids-Waterloo-Iowa City-Dubuque broadcast area). Such a determination may be made via, for example, shortest distance algorithms determining/identifying the closest broadcast station and/or the closest broadcast station of a specific broadcast affiliate (e.g., the closest CBS station or tower). As will be recognized, a variety of other approaches and techniques can be used to determine/identify the appropriate broadcast area (e.g., DMA, zip code, block group, census tract, and government-established area/zone) for a local device 105. For example, in one embodiment, a local device 105 can determine/identify its corresponding broadcast area and provide the same to the authentication server 115. Such a determination/identification may occur on a periodic basis, regular basis, continuous basis, and/or in response to certain triggers (e.g., searches related to content).

In various embodiments, by determining the broadcast area in which a local device 105 is located, the authentication server 115 (and/or local device 105 or other computing entities) can determine/identify the channels (or other offerings) to which the local device 105 and remote device 120 have access rights (e.g., based on the local device's 105 location). For example, after determining/identifying the broadcast area, the authentication server 115 can determine/identify the broadcast stations (and/or corresponding broadcast rights holder) available in the broadcast area. For example, the authentication server 115 can determine/identify the broadcast stations shown in Table 5 as being associated with the Cedar Rapids-Waterloo-Iowa City-Dubuque broadcast area (e.g., broadcast area 637).

TABLE 5

| BROADCAST STATION | AFFILIATION |
|---|---|
| KCRG | ABC |
| KFXA | FOX |
| KFXB | FOX |
| KGAN | CBS |
| KIIN | PBS |
| KPXR | ION |
| KRIN | PBS |
| KWKB | The CW |
| KWWF | AMG TV |
| KWWL | NBC |

In embodiment, after determining/identifying the broadcast stations (and/or corresponding broadcast rights holder) for the broadcast area, the authentication server 115 can provide program information/data (to the local device 105 and/or remote device 120) for the broadcast area in which the local device 105 is located (Block 1615 of FIG. 16). As shown in FIGS. 18 and 19, the program information/data may include program guides and/or program listings of live content (including linear content) and/or on-demand content, for example, that are available for consumption via the local device 105 and/or remote device 120. For instance, as seen in these figures, this exemplary program information/data includes content available during the 8:00 pm and/or 9:00 pm hours on ABC, CBS, FOX, NBC, PBS, The CW, and ION.

In one embodiment, the authentication server 115 may only provide program information/data for broadcast stations (e.g., ABC, CBS, FOX, NBC, PBS, The CW, ION) that have registered for such services with an independent third party operating the authentication server 115, such as Syncbak. In another embodiment, program information/data for all broadcast stations (e.g., ABC, CBS, FOX, NBC, PBS, The CW, ION, AMG TV) associated with the broadcast area can be provided regardless of their affiliation with the independent third party operating the authentication server 115 (e.g., Syncbak). In yet another embodiment, as indicated, a broadcaster may operate the authentication server 115 and therefore only provide program information/data for its station (e.g., FOX). The local device 105 and/or remote device 120 can receive, refresh, and/or update such program information/data on a periodic basis, regular basis, continuous basis, and/or in response to certain triggers (e.g., searches related to content) through a variety of approaches and techniques (Block 1510 of FIG. 15).

In one embodiment, after determining/identifying the appropriate broadcast area, broadcast stations, and/or program information, the authentication server 115 can store the same in association with the user's account. For example, the authentication server 115 may store an indication that the user account is associated with broadcast area 637 (e.g., the user account has access rights to the content from broadcasters in broadcast area 637). In another embodiment, the authentication server 115 may store an indication that the user account is associated with broadcasters KCRG, KFXA, KFXB, KGAN, KILN, KPXR, KRIN, KWKB, KWWF, and KWWL (e.g., the user account has access rights to the content from these broadcasters).

In various embodiments, the described operations and processes allow the physical location of the local device 105 to be established to determine the content the user is permitted to receive. For ease in understanding various embodiments of the present invention, this approach for broadcast area identification may be referred to generically as "in-area: level 3."

As will be recognized, a variety of other approaches and techniques can be used to adapt to various needs and circumstances.

3. Content Access for Local Device

In one embodiment, a user (e.g., operating a local device 105) can access content from a broadcaster in a variety of ways. For instance, a local device 105 located in Fayette, Iowa, can access OTA content in the Cedar Rapids-Waterloo-Iowa City-Dubuque broadcast area by adjusting its tuner to the appropriate frequency. The content may include television broadcasts, television programs, movies, datacasts, music, images, videos, text, webpages, and/or the like.

In another embodiment, a user (e.g., operating a local device 105) can access content from a broadcaster via a network such as the Internet (any other wired or wireless network). The content may be stored and distributed via one or more content servers 125 and/or one or more broadcast servers in response (e.g., after) to an appropriate notification from the authentication server 115. In such an embodiment, the authentication server 115 may store one or more distribution parameters for distributing the different content and evaluating requests for content for compliance with the distribution parameters. In another embodiment, the authentication server 115 may receive content for distribution from one or more content servers 125 and/or one or more broadcast servers. In such an embodiment, the authentication server 115 may store the distribution parameters and/or tag (e.g., include metadata) the different content with the corresponding distribution parameters. Then, the authentication server 115 can evaluate requests for content for compliance with the distribution parameters and distribute the content accordingly.

As previously described, distribution parameters can be defined by various parties, including the broadcaster or other content provider. Such parameters may be included with the content as metadata (e.g., tagged by a variety of parties) that can be read and interpreted by various computing devices. Among the parameters that can be defined are the content to which the parameters apply, the versions to which the parameters apply, the encoding scheme, the identification or authentication level or levels required for access to the content (e.g., in-area, out-of-area, level 1, level 2, level 3), the timing requirements for access to the content, the use requirements for access to the content, the ability to access the content linearly, the ability to access the content near linearly, the ability to access the content on-demand, and/or the like. For example, Table 6 below provides exemplary distribution parameters for sample content (the television show X Factor, the Ellen DeGeneres Show, live college sporting events.

TABLE 6

| CONTENT | VERSION | DISTRIBUTION PARAMETERS |
|---|---|---|
| X Factor | Current Episode | Encode = YES<br>Level(s) = In-Area: Level 1<br>OR In-Area: Level 3<br>Linear = YES<br>Near Linear = YES If within 59<br>Minutes of Start Time<br>On Demand = NO |
| Ellen DeGeneres Show | Current Episode | Encode = YES<br>Level(s) = In-Area: Level 3<br>Linear = YES<br>Near Linear = NO<br>On Demand = YES If within 8<br>Hours of Original Airing |
| Live College Sporting Events | N/A | Encode = YES<br>Level(s) = In-Area: Level 3 OR<br>Out-of-Area: Level 3<br>Linear = YES |

TABLE 6-continued

| CONTENT | VERSION | DISTRIBUTION PARAMETERS |
|---|---|---|
| | | Near Linear = YES<br>On Demand = YES but Only 48<br>Hours after Live Airing |

To access such content, the local device 105 may generate a request for the desired content. To do so, a user (e.g., operating a local device 105) may select content from program information, such as the program guide or program listing shown in FIG. 19. For example, a user can (e.g., operating a local device 105) select or click on text, a graphic, or a hyperlink in the program information/data to access the corresponding content. Such an action may generate a request for the content (Block 1515 of FIG. 15). In one embodiment, the request for content may comprise information/data that can be used to uniquely identify the user and/or local device 105. For example, in one embodiment, the request for content may include user information/data and/or a local device ID.

Similarly, a user (e.g., operating a local device 105) can perform a search for content. To do so, a user (e.g., operating a local device 105) may initiate a search for content via an appropriate interface by entering search terms. For example, the user may enter "X Factor" as the search terms. In response, the user (e.g., operating a local device 105) can be provided with text, a graphic, or a hyperlink to access the X Factor via the appropriate broadcaster. Such an action may generate a request for the content. As indicated, the request for content may comprise information/data that can be used to uniquely identify the user and/or local device 105.

The local device 105 may transmit the request to the authentication server 115 and/or the broadcaster (e.g., to a broadcast server). In one embodiment, the request for content is received via the authentication server 115 (Block 1620 of FIG. 16). In response to (e.g., after) receiving the request for content, the authentication server 115 may determine whether the requested content is content for which the user (e.g., local device 105) has access rights based on, for example, the local device's 105 location and/or distribution parameters (Block 1625 of FIG. 16). To do so, the authentication server 115 may use the user information/data and/or local device ID provided in the request to access the corresponding user account. The authentication server 115 may use the distribution parameters for the requested content.

By accessing the corresponding user account and the distribution parameters corresponding to the requested content, the authentication server 115 (e.g., via a content module) can determine whether the user (e.g., local device 105) has access rights to the requested content. Such a determination may be made by identifying the broadcast area, broadcasters, and/or program information/data to which the user has access rights as indicated in the user account.

In response to (e.g., after) a determination that the user (e.g., local device 105) has access rights to the requested content in accordance with the distribution parameters, the authentication server 115 can allow transmission (e.g., distribution) of the content to the local device 105 (Block 1630 of FIG. 16). However, in response to (e.g., after) a determination that the user does not have access rights to the requested content in accordance with the distribution parameters, the authentication server 115 may not allow transmission (e.g., distribution) of the content to the local device 105 (Block 1630 of FIG. 16).

As previously described, the content can be transmitted (e.g., distributed) to the local device 105 in a variety of ways.

For example, in one embodiment, the authentication server 115 can be used to transmit the content (it has tagged and is storing) to the local device 105 via the Internet (or other network). In another embodiment, the authentication server 115 can transmit a notification to the broadcaster (e.g., content server 125 or broadcast server) to provide the specified content to the local device 105 via the Internet (or other network), bypassing the authentication server 115 for distribution of the content. As indicated in Block 1520 of FIG. 15, the local device 105 can receive the requested content and display, play, or otherwise provide the same and/or make accessible via the local device 105.

In one embodiment, the local device 105 may access content (e.g., via a user operating the local device 105) that is currently being broadcast (e.g., via an OTA broadcast, a DBS broadcast, and/or a cable broadcast). For example, the local device may access (e.g., via a user operating the local device 105) the television show The X Factor 35 minutes after The X Factor broadcast begins. In this example, the authentication server 115 and/or broadcast system 100 may allow the local device 105 to receive the content (e.g., the television show The X Factor) via a network such as the Internet (a) that is currently being broadcast or (b) from the beginning of the show The X Factor. As will be recognized, a variety of other approaches and techniques may also be used for distributing content to local devices 105.

5. Content Access for Remote Device

As indicated, the term remote device may refer to, for example, an electronic device located outside a specific broadcast area when attempting to access content associated with the broadcast area (e.g., an electronic device located outside a broadcaster's broadcast area when attempting to access the broadcaster's content). For ease in understanding various embodiments of the present invention, this approach for broadcast area identification may be referred to as "out-of-area: level 3." Although, in certain embodiments, the remote device 120 may also be located within a broadcaster's broadcast area when attempting to access the broadcaster's content. For example, a remote device 120 may be a user's mobile phone, laptop, or television that, at various times, may be within or outside a specific broadcast area.

In one embodiment, after determining that the local device 105 is within or proximate a particular broadcast area, the remote device 120 may be able access the broadcaster content via the Internet, for example, when outside the broadcast area (e.g., DMA, zip code, block group, census tract, and government-established area/zone). To do so, the remote device 120 can first be registered with the local device 105 and/or the authentication server 115 (Block 1500 of FIG. 15). In one embodiment, registration may include inputting (e.g., via a user operating an electronic device) user information/data and/or information/data associated with the remote device 120 via a module, program, browser, or application that was downloaded or preinstalled on the remote device 120. In another embodiment, registration may include inputting (e.g., via a user operating an electronic device) user information/data and/or information/data associated with the remote device 120 via a webpage of an independent third party or broadcaster. The information/data associated with the remote device 120 may include information/data that uniquely identifies the user or remote device 120, such as a SIM number, MAC address, IMSI number, IP address, MEID, and/or other device identifier. Such information/data may be stored, for example, by the authentication server 115 in association with a user's account and/or by a corresponding local device 105.

In one embodiment, after the remote device 120 has been registered, the remote device 120 may receive program information/data for the broadcast area in which the local device 105 is located (Block 1510 of FIG. 15). As previously described, the program information/data may include program guides and/or program listings of live content (including linear content) and/or on-demand content, for example, that are available for consumption via the remote device 120. For instance, as seen in FIGS. 18 and 19, this exemplary program information/data includes content available during the 8:00 pm and/or 9:00 pm hours on ABC, CBS, FOX, NBC, PBS, The CW, and ION. As will be recognized, though, content may be accessed in a variety of other ways as well.

In one embodiment, a user (e.g., operating a remote device 120) can access content from a broadcaster via a network such as the Internet (any other wired or wireless network). To do so, a user (e.g., operating a remote device 120) may select content from program information, such as the program guide or program listing shown in FIG. 19. For instance, a user can (e.g., operating a remote device 120) select or click on text, a graphic, or a hyperlink in the program information/data to access the corresponding content. Such an action may generate a request for the content (Block 1515 of FIG. 15). In one embodiment, the request for content may comprise information/data that can be used to uniquely identify the user and/or the remote device 120. For example, in one embodiment, the request for content may include user information/data and/or a remote device ID.

The remote device 120 may transmit the request to the local device 105, the authentication server 115, and/or the broadcaster (e.g., to a broadcast server). In one embodiment, the request for content is transmitted to and received by the authentication server 115. In response to (e.g., after) receiving the request for content (Block 1620 of FIG. 16), the authentication server 115 (e.g., via a content module) may determine whether the requested content is content for which the user (e.g., remote device 120) has access rights based on, for example, the corresponding local device's 105 location and the distribution parameters (Block 1625 of FIG. 16). To do so, the authentication server 115 may use the user information/data and/or remote device ID provided in the request to access the corresponding user account. By accessing the corresponding user account, the authentication server 115 can determine whether the user (e.g., remote device 120) has access rights to the requested content based on the user account and/or the distribution parameters. Table 7 below provides exemplary distribution parameters.

TABLE 7

| CONTENT | VERSION | DISTRIBUTION PARAMETERS |
| --- | --- | --- |
| Sports Talk | Current Episode | Encode = YES |
| | | Level(s) = In-Area: Level 3 |
| | | OR Out-of-Area: Level 3 |
| | | Linear = YES |
| | | Near Linear = YES |
| | | Near Linear = NO |
| | | On Demand = YES |
| Local Live Event | N/A | Encode = YES |
| | | Level(s) = In-Area: Level 3 |
| | | OR Out-of-Area: Level 3 |
| | | Linear = YES |
| | | Near Linear = NO |
| | | On Demand = YES |

Further, as indicated, such a determination may be made by identifying the broadcast area, broadcasters, and/or program information/data to which the user has access rights as indicated in the user account. In response to (e.g., after) a determination that the user (e.g., remote device 120) has access rights to the requested content in accordance with the distribution parameters, the authentication server 115 can allow transmission (e.g., distribution) of the content to the remote device 120 (Block 1630 of FIG. 16). However, in response to (e.g., after) a determination that the user does not have access rights to the requested content in accordance with the distribution parameters, the authentication server 115 may not allow transmission (e.g., distribution) of the content to the remote device 120 (Block 1630 of FIG. 16).

The content can be transmitted (e.g., distributed) to the remote device 120 in a variety of ways. For example, in one embodiment, the authentication server 115 can be used to transmit the content (it has tagged and is storing) to the remote device 120 via the Internet (or other wired or wireless network). In another embodiment, the authentication server 115 can transmit a notification to the broadcaster (e.g., content server 125 or broadcast server) to provide the specified content to the remote device 120 via the Internet (or other network), bypassing the authentication server 115 for distribution of the content. As indicated in Block 1520 of FIG. 15, the remote device 120 can receive the requested content and display, play, or otherwise provide the same and/or make accessible via the remote device 120.

In various embodiments, because the physical location of the local device 105 has been established, the remote device 120 can receive content based on the local device's 105 location. In various embodiments, this approach allows the broadcaster or third party to identify content (or broadcasters and/or broadcast areas from which) the user (e.g., remote device 120) is permitted to receive via the Internet (or other wired or wireless network). For example, a user may take her mobile phone or laptop on a business trip or vacation outside the broadcaster's broadcast area. In such a case, the described operations and processes can allow the user (or other parties) to access content (e.g., stream a newscast or television program) from a broadcaster even when outside the broadcaster's broadcast area.

In one embodiment, the user may be limited in the number of remote devices 120 that can be registered for access to content. For example, the user may only be able to register five devices with the local device 105. In various embodiments, this may limit fraud attempts by users in registering friends' or relatives' remote devices 120 for access to content outside a specific broadcast area.

VII. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for distributing content, the method comprising:

after a broadcast area associated with an electronic device is periodically identified based at least in part on the electronic device's location, receiving, via one or more processors, a request for content associated with the broadcast area, (a) the broadcast area defining a geographic region in which each of a plurality of broadcasters has the right to and does provide respective over-the-air broadcasts, (b) the request for content being generated by the electronic device, and (c) the requested content corresponding to at least one of the over-the-air broadcasts for the broadcast area;

determining, via the one or more processors, whether the request for content is in compliance with one or more distribution parameters, the one or more distribution parameters associated with the requested content corresponding to at least one of the one or more over-the-air broadcasts for the broadcast area; and after determining that the request for content is in compliance with the one or more distribution parameters, causing distribution of, via the one or more processors, the content to the electronic device.

2. The method of claim 1, wherein causing distribution of the content to the electronic device comprises transmitting, via the one or more processors, the content to the electronic device.

3. The method of claim 1, wherein causing distribution of the content to the electronic device comprises transmitting, via the one or more processors, a notification to a content server to transmit the content to the electronic device.

4. The method of claim 1 further comprising transmitting program information for the broadcast area to the electronic device.

5. The method of claim 1 further comprising registering the electronic device for broadcast area identification.

6. An apparatus comprising at least one processor and at least one memory including computer program code, the at least one memory and the computer program code configured to, with the processor, cause the apparatus to at least:

after a broadcast area associated with an electronic device is periodically identified based at least in part on the electronic device's location, receive a request for content associated with the broadcast area, (a) the broadcast area defining a geographic region in which each of a plurality of broadcasters has the right to provide respective over-the-air broadcasts, (b) the request for content being generated by the electronic device, and (c) the requested content corresponding to at least one of the over-the-air broadcasts for the broadcast area;

determine whether the request for content is in compliance with one or more distribution parameters, the one or more distribution parameters associated with the requested content corresponding to at least one of the one or more over-the-air broadcasts for the broadcast area; and after determining that the request for content is in compliance with the one or more distribution parameters, cause distribution of the content to the electronic device.

7. The apparatus of claim 6, wherein causing distribution of the content to the electronic device comprises transmitting the content to the electronic device.

8. The apparatus of claim 6, wherein causing distribution of the content to the electronic device comprises transmitting a notification to a content server to transmit the content to the electronic device.

9. The apparatus of claim 6, wherein the memory and computer program code are further configured to, with the processor, cause the apparatus to transmit program information for the broadcast area to the electronic device.

10. The apparatus of claim 6, wherein the memory and computer program code are further configured to, with the processor, cause the apparatus to register the electronic device for broadcast area identification.

11. A computer program product for distributing content, the computer program product comprising at least one non-transitory computer-readable storage medium having computer-readable program code portions stored therein, the computer-readable program code portions comprising:

an executable portion configured to, after a broadcast area associated with an electronic device is periodically identified based at least in part on the electronic device's location, receive a request for content associated with the broadcast area, (a) the broadcast area defining a geographic region in which each of a plurality of broadcasters has the right to provide respective over-the-air broadcasts, (b) the request for content being generated by the electronic device, and (c) the requested content corresponding to at least one of the over-the-air broadcasts for the broadcast area;

an executable portion configured to determine whether the request for content is in compliance with one or more distribution parameters, the one or more distribution parameters associated with the requested content corresponding to at least one of the one or more over-the-air broadcasts for the broadcast area; and an executable portion configured to, after determining that the request for content is in compliance with the one or more distribution parameters, cause distribution of the content to the electronic device.

12. The computer program product of claim 11, wherein causing distribution of the content to the electronic device comprises transmitting the content to the electronic device.

13. The computer program product of claim 11, wherein causing distribution of the content to the electronic device comprises transmitting a notification to a content server to transmit the content to the electronic device.

14. The computer program product of claim 11 further comprising an executable portion configured to transmit program information for the broadcast area to the electronic device.

15. The computer program product of claim 11 further comprising an executable portion configured to register the electronic device for broadcast area identification.

* * * * *